United States Patent
Nozawa

(10) Patent No.: US 8,116,945 B2
(45) Date of Patent: Feb. 14, 2012

(54) ELECTRIC POWER STEERING DEVICE

(75) Inventor: Tetsuya Nozawa, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 472 days.

(21) Appl. No.: 12/354,401

(22) Filed: Jan. 15, 2009

(65) Prior Publication Data

US 2009/0192665 A1 Jul. 30, 2009

(30) Foreign Application Priority Data

Jan. 16, 2008 (JP) .................................. 2008-007107
Mar. 11, 2008 (JP) .................................. 2008-061489

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)

(52) U.S. Cl. ............................. 701/41; 701/31; 180/443
(58) Field of Classification Search ...................... 701/29, 701/31, 36, 41–44; 318/400.09, 400.23; 180/6.44, 417–446
See application file for complete search history.

(56) References Cited

U.S. PATENT DOCUMENTS

| | | | | |
|---|---|---|---|---|
| 7,161,317 B2* | 1/2007 | Matsushita et al. | ............ | 318/432 |
| 7,187,153 B2* | 3/2007 | Imagawa et al. | .............. | 318/638 |
| 7,376,498 B2* | 5/2008 | Sakurai et al. | .................. | 701/29 |
| 7,406,375 B2* | 7/2008 | Fujita et al. | ...................... | 701/41 |
| 7,459,879 B2* | 12/2008 | Kezobo et al. | ................. | 318/803 |
| 7,845,459 B2* | 12/2010 | Kasai | ............................ | 180/443 |
| 2005/0241875 A1* | 11/2005 | Ta et al. | ........................ | 180/443 |
| 2008/0067960 A1* | 3/2008 | Maeda et al. | ............ | 318/400.02 |
| 2008/0167780 A1 | 7/2008 | Suzuki et al. | | |
| 2008/0217096 A1 | 9/2008 | Suzuki et al. | | |
| 2008/0315809 A1 | 12/2008 | Tamaizumi | | |

FOREIGN PATENT DOCUMENTS

| | | |
|---|---|---|
| EP | 1 737 116 A1 | 12/2006 |
| JP | 2003-26020 | 1/2003 |

OTHER PUBLICATIONS

U.S. Appl. No. 12/260,472, filed Oct. 29, 2008, Tamaizumi et al.
U.S. Appl. No. 12/273,881, filed Nov. 19, 2008, Tamaizumi.
U.S. Appl. No. 12/355,118, filed Jan. 16, 2009, Nozawa et al.
Extended Search Report issued Dec. 1, 2010, in European Patent Application No. 09150645.1—2423 / 2080687.

* cited by examiner

*Primary Examiner* — Jack Keith
*Assistant Examiner* — Rami Khatib
(74) *Attorney, Agent, or Firm* — Oblon, Spivak, McClelland, Maier & Neustadt, L.L.P.

(57) ABSTRACT

A rotational angle correction controller controls generation of an inverse assist torque using the "phase deviation" due to the correction of the rotational angle θ, thereby performing the rotational angle correction control to smooth rotation of the motor during two phase drive. In addition, the rotational angle correction controller includes an oscillation detection part that detects the occurrence of oscillation in the steering system. When the level of the detected oscillation exceeds the predetermined level, the correction amount in the rotational angle correction control is reduced.

20 Claims, 24 Drawing Sheets

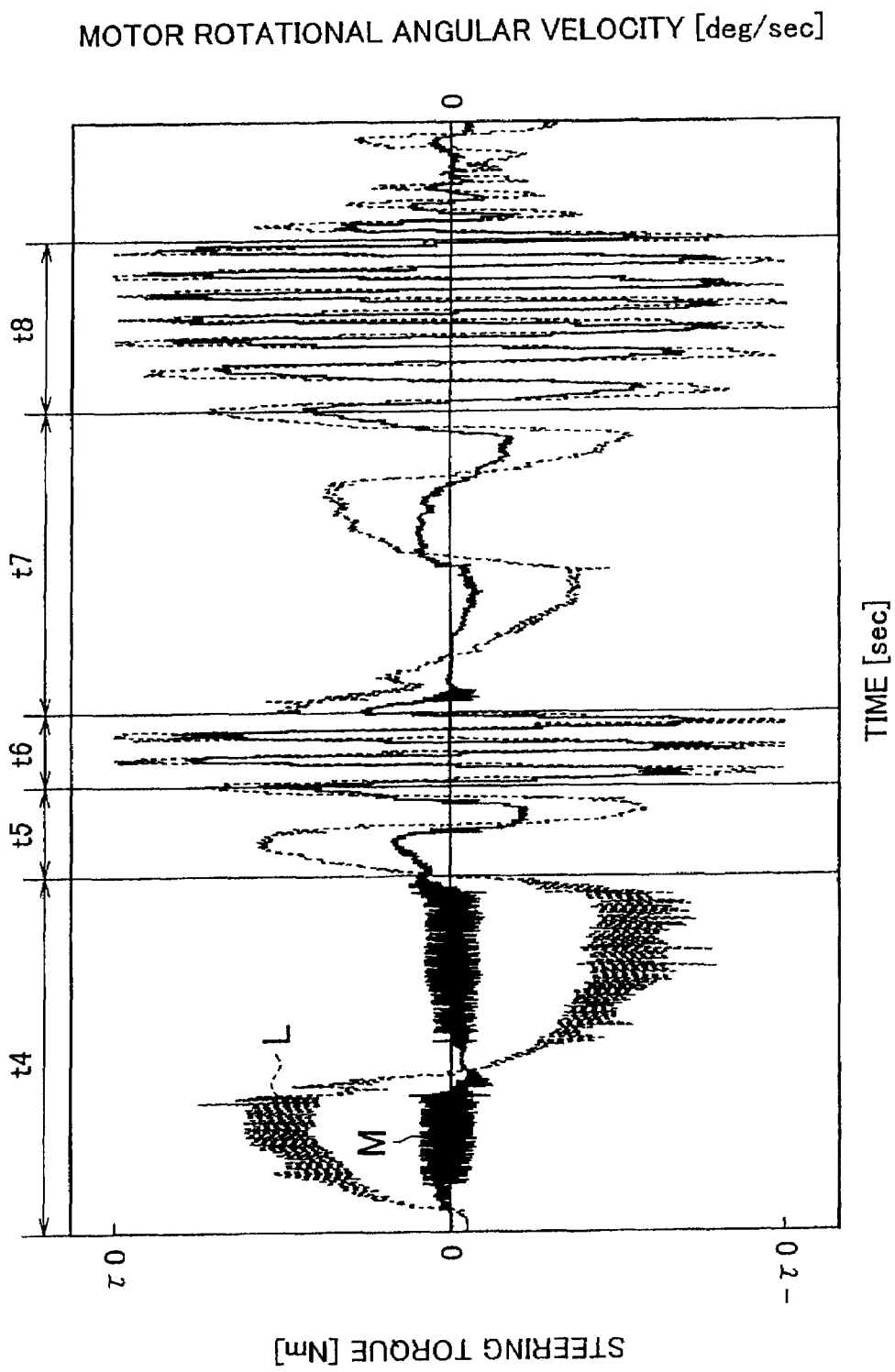

ELECTRIC POWER STEERING DEVICE

INCORPORATION BY REFERENCE

The disclosure of Japanese Patent Application No. 2008-007107 filed on Jan. 16, 2008 and Japanese Patent Application No. 2008-061489 filed on Mar. 11, 2008 including the specification, drawings and abstract is incorporated herein by reference in its entirety.

BACKGROUND OF THE INVENTION

1. Field of the Invention

This invention relates to an electric power steering device.

2. Description of the Related Art

Many of the motor control devices that are used in electric power steering devices (EPS) and the like are provided with abnormality detecting means that detects an abnormality when an electrification failure occurs in any of the three phases (any of U, V and W phases) of a motor due to disconnection of a power supply line or a contact failure of a drive circuit. Upon detection of the abnormality, these motor control devices stop the motor control promptly to attain fail safe.

However, the steering characteristics of the EPS change significantly due to the discontinuation of the motor control. In other words, a greater steering force is required for the driver to perform accurate steering operation. There is a motor control device in which even when a phase with an electrification failure is detected, motor control is continued with the other two electrification phases (see Japanese Patent Application Publication No. 2003-26020 (JP-A-2003-26020), for example). With this device, an assist power can be continuously applied to the steering system to avoid an increase of burden that is imposed on a driver when attaining fail safe.

However, in the case described above in which an electrification failure occurs in a phase and therefore the motor control is continued with the other two electrification phases, deterioration of steering feeling occurs inevitably due to the occurrence of a torque ripple, in a configuration where a sinusoidal waveform current is applied to each electrification phase, as shown in FIG. 29 (in the illustrated example, the U phase is abnormal, and V and W phases are electrified).

Specifically, as shown in the d/q coordinate system of FIG. 30 which shows how the currents change when the motor is driven with the two phases, the actual q-axis current value changes sinusoidally, in spite of the constant q-axis current command value, which is a control target value of a motor torque. In other words, because a motor current corresponding to a requested torque is not generated, the motor is continuously driven without delivering its true output performance, causing a significant change in the assist power of the motor.

SUMMARY OF THE INVENTION

The invention provides an electric power steering device that stably applies an assist power by facilitating rotation of a motor when the motor is driven with two phases thereof due to an electrification failure. The invention also provides a method of controlling the electric power steering device.

A first aspect of the invention is an electric power steering device, which has: a steering force assisting device having a motor that functions as a drive source and providing a steering system with an assist power for assisting a steering operation; an oscillation detection part that detects an occurrence of an oscillation in the steering system; and a control device that controls an operation of the steering force assisting device through a supply of a drive power to the motor, the control device including: a motor control signal output part that outputs a motor control signal; a drive circuit that supplies the drive power of three phases to the motor on the basis of the motor control signal; and an abnormality detecting part that detects an occurrence of a failure caused in the phases of the motor, wherein the motor control signal output part generates the motor control signal by executing current control on the basis of a rotational angle of the motor and, when the occurrence of the failure is detected, executes output of the motor control signal by means of two electrification phases other than a phase with the failure; when the occurrence of the failure is detected, the motor control signal output part performs a correction of the rotational angle and changes the amount of the correction of the rotational angle in accordance with the level of the oscillation detected. The motor control signal output part may be configured so that, when the occurrence of the failure is detected, the motor control signal output part executes the current control for supplying each of the electrification phases with a phase current that changes substantially in the form of a secant curve, a cosecant curve, or a tangent curve based on an asymptotic line, on which the rotational angle is a predetermined rotational angle corresponding to a phase with the failure, executes current restriction for restricting the phase current within a predetermined range, and performs a correction of the rotational angle so that an angular phase is shifted in a direction of the steering operation, and performs a reduction of the amount of correction of the rotational angle when the oscillation the level of which exceeds a predetermined level is detected.

The motor control signal output part may be configured so that, when a direction of the steering operation does not match a rotational direction of the motor, the motor control signal output part performs the correction of the rotational angle so that the angular phase is shifted in a direction to the predetermined rotational angle corresponding to the asymptotic line.

The correction of the rotational angle may be performed when the rotational angle of the motor falls within a range in which the current restriction is performed. According to the above configurations, except for the predetermined angle corresponding to the asymptotic line (a current restriction range in the vicinity of the predetermined rotational angle, when the value of the phase current applied to each phase has a limit), a motor current corresponding to a requested torque can be generated. As a result, even when the electrification failure occurs, the motor can be driven continuously while maintaining the high output performance, without generating a significant torque ripple.

In addition, when the correction of the rotational angle is properly performed during two phase drive, it is possible to suppress the occurrence of the inverse assist torque that is caused by the phase delay in the current feedback control and impedes rotation of the motor, during normal steering operation where the direction of the steering operation (steering direction) matches the motor rotational direction. On the other hand, when a stop of rotation or an inverse rotation of the motor is caused due to the existence of the deceleration section near the asymptotic line that is caused by the electric current restriction, the inverse assist torque that assists the inverse rotation is generated using the deviation in the phase that is caused by the correction of the rotational angle. Thus, by accelerating rotation of the motor by the inverse assist, it is possible to suppress the occurrence of a so-called stuck steering wheel that significantly deteriorates the rotational follow-up performance of the motor with respect to the steering operation. In particular, by performing the correction of the rotational angle so that the angular phase is shifted in a direction to the predetermined rotational angle corresponding to the asymptotic line when a direction of the steering operation does not match a rotational direction of the motor, even when the motor rotates inversely due to the existence of the deceleration section, it is possible to generate the inverse assist torque not only when the rotational angle is pulled back in the direction opposite to the steering direction beyond the predetermined rotational angle corresponding to the asymptotic line by the inverse rotation, but also when the rotational angle is still ahead of the predetermined rotational angle in the steering direction. In addition, by performing the correction of the rotational angle when the rotational angle of the motor falls within a range in which the current restriction is performed, the case is excluded where the inverse rotation is caused by the application of reaction force to the turning wheel, such as when a tire hits a curbstone, and it is therefore possible to more accurately perform the correction of the rotational angle to suppress the occurrence of the stuck steering wheel. As a result, it is possible to more effectively accelerate rotation of the motor. By further smoothing rotation of the motor in this way, it is made possible to realize better steering feeling even during two phase drive.

When rotation of the motor is smoothed by controlling the occurrence of the inverse assist torque using "phase deviation" due to the correction of the rotational angle, the achieved effects are maximized when the rotational angle correction amount is optimal. However, when the excess or deficiency in the rotational angle correction amount occurs, that is, when the rotational angle correction amount deviates from the optimum value, the advantageous effects are reduced as the deviation increases. When the deviation further increases, there is a possibility that the inverse assist torque occurs that, contrary to the original object, impedes smooth rotation of the motor. Thus, it is very difficult to previously set the correction amount so that the rotational angle correction amount is always optimum.

According to the above configuration, however, the unsmooth rotation due to the lack of the correction amount is avoided by setting a relatively large value (absolute value) having a margin as the initial value of the rotational angle correction amount, and when the oscillation the level of which is high enough to affect the steering feeling, the rotational angle correction amount that is highly probable to have caused the occurrence of the oscillation is reduced, whereby the oscillation can be reduced. As a result, it is made possible to further smooth rotation of the motor and realize better steering feeling with a simple configuration.

The reduction of the amount of correction may be performed when the rotational angular speed of the motor is equal to or higher than a predetermined speed. Specifically, when the rotational angular speed of the motor is equal to or lower than the critical speed required for the motor to pass the deceleration section and the amount of correction of the rotational angle is reduced, the inverse assist performed when the inverse rotation as described above occurs can fall short, which can result in the occurrence of the stuck steering wheel. According to the above configuration, it is possible to further ensure the effect of suppressing the stuck steering wheel by the inverse assist while suppressing the oscillation due to the intentional generation of the inverse assist torque.

The motor control signal output part may reduce the amount of correction of the rotational angle inversely proportionally to the level of the oscillation when the level of the oscillation exceeds the predetermined level.

According to the above configuration, it is possible to more effectively reduce the oscillation due to the inverse assist torque. The oscillation detection part may determine the level of the oscillation based on the variation of the rotational angle that occurs during the time period from when the sign of the rotational angle is inverted to when the sign is again inverted.

According to the above configuration, even when the amplitude of the oscillation is not uniform or when a so-called whirling occurs, it is possible to accurately determine the level (magnitude) of the occurring oscillation. As a result, it is made possible to prevent erroneous operation of the stuck steering wheel suppression control and more effectively suppress the oscillation.

A second aspect of the invention is a control method of an electric power steering device which has a steering force assisting device having a motor that functions as a drive source and providing a steering system with an assist power for assisting a steering operation and an oscillation detection part that detects the occurrence of an oscillation in the steering system, and which controls the operation of the steering force assisting device through a supply of a drive power to the motor, the method including: generating and outputting a motor control signal by executing current control on the basis of a rotational angle of the motor; supplying the drive power of three phases to the motor on the basis of the motor control signal; detecting the occurrence of a failure caused in the phases of the motor; and, when the occurrence of the failure is detected, executing output of the motor control signal by means of two electrification phases other than a phase with the failure, performing a correction of the rotational angle, and changing the amount of the correction of the rotational angle in accordance with the level of the oscillation detected.

According to the invention, an electric power steering device is provided that stably applies an assist power by facilitating rotation of a motor when the motor is driven with two phases thereof due to an electrification failure. The invention also provides a method of controlling the electric power steering device.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 17 is a graph showing the relationship between a steering torque and a rotational angular velocity of a motor obtained during two phase drive (rotational angle correction is performed);

DETAILED DESCRIPTION OF EMBODIMENTS

An electric power steering device (EPS) according to a first embodiment of the invention is described hereinafter with reference to the drawings.

Figure 1:
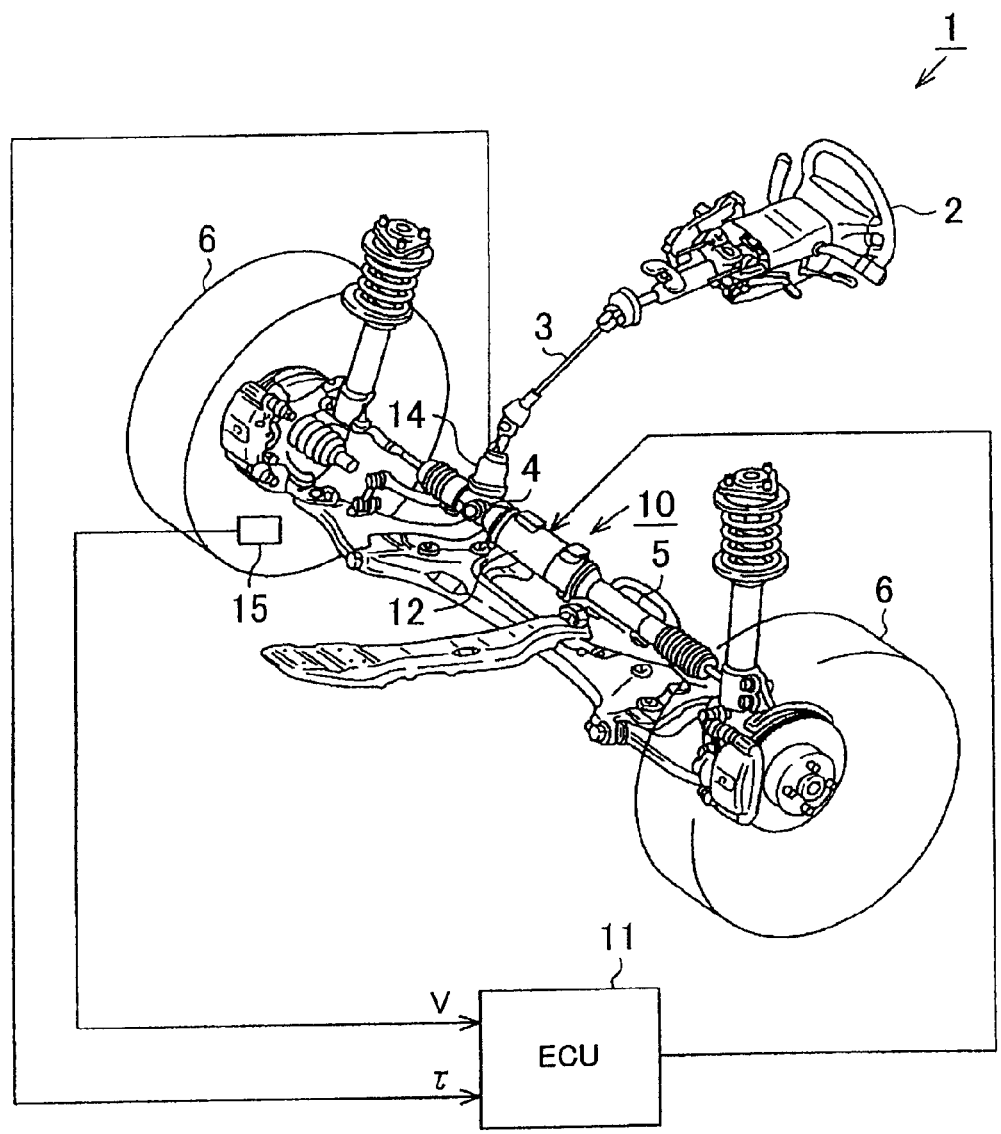
FIG. 1 is a schematic configuration diagram of an electric power steering device (EPS)

FIG. 1 is a schematic configuration diagram of an EPS 1 according to the first embodiment. As shown in the diagram, a steering shaft 3 connected to a steering wheel (steering) 2 is connected to a rack 5 via a rack-and-pinion mechanism 4. When a steering operation is performed, the rotation of the steering shaft 3 is converted into a linear motion of the rack 5 by the rack-and-pinion mechanism 4. Then, the linear motion of the rack 5 changes the steering angle of a turning wheel 6.

The EPS 1 has an EPS actuator 10 which functions as a steering force assisting device for applying an assist power to a steering system to assist its steering operation, and an electrical control unit (ECU) 11, which serves as the control means, for controlling actuation of the EPS actuator 10.

The EPS actuator 10 of this embodiment is a so-called rack-type EPS actuator, in which a motor 12 serving as a drive power source is arranged coaxially with the rack 5. In the EPS actuator 10, an assist torque generated by the motor 12 is transmitted to the rack 5 via a ball screw mechanism (not shown). The motor 12 in this embodiment is a brushless motor, and is rotated by a three-phase (U, V and W) drive power supplied from the ECU 11. The ECU 11 serving as a motor control device controls the assist power applied to the steering system, by controlling the assist torque generated by the motor 12 (power assist control).

In this embodiment, a torque sensor 14 and a vehicle speed sensor 15 are connected to the ECU 11. The ECU 11 executes the actuation of the EPS actuator 10, that is, power assist control, on the basis of a steering torque $\tau$ detected by the torque sensor 14 and a vehicle speed V detected by the vehicle speed sensor 15.

Figure 2:
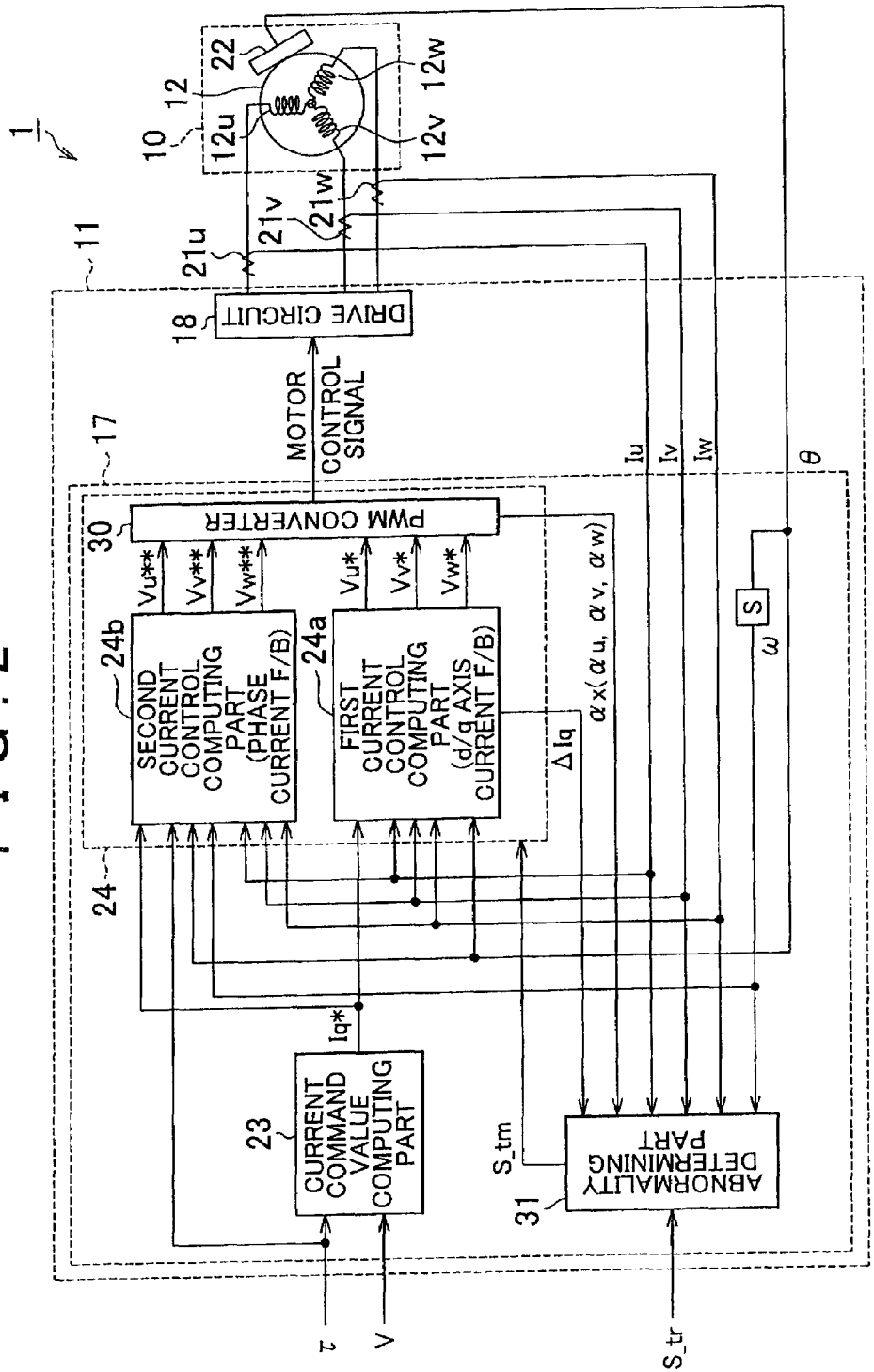
FIG. 2 is a block diagram showing an electrical configuration of the EPS.

Next, an electrical configuration of the EPS of this embodiment is described. FIG. 2 is a control block diagram of the EPS of this embodiment. As shown in the diagram, the ECU 11 has a microcomputer 17 functioning as the motor control signal output means for outputting a motor control signal, and a drive circuit 18 for supplying a three-phase drive power to the motor 12 on the basis of the motor control signal.

The drive circuit 18 of this embodiment is a conventional PWM inverter that is structured such that a pair of switching elements connected in series is set as a basic unit (arm) and three arms corresponding to the respective phases are connected in parallel. A motor control signal that is output from the microcomputer 17 defines an ON duty ratio of each of the switching elements constructing the drive circuit 18. The motor control signal is applied to a gate terminal of each of the switching elements, and each of the switching elements is turned on and off in response to the motor control signal. Accordingly, a direct-current (DC) voltage of an on-vehicle power source (not shown) is converted into a three-phase (U, V and W) drive power supplied to the motor 12.

In this embodiment, the ECU 11 is connected to current sensors 21$u$, 21$v$ and 21$w$ for detecting phase current values Iu, Iv and Iw applied to the motor 12, and is connected also to a rotational angle sensor 22 for detecting a rotational angle (electrical angle) $\theta$ of the motor 12. The microcomputer 17 outputs the motor control signal to the drive circuit 18 on the basis of not only each of the phase current values Iu, Iv and Iw of the motor 12 but also the rotational angle $\theta$, the steering torque $\tau$, and the vehicle speed V that are detected on the basis of the output signal of each of the sensors.

In other words, the microcomputer 17 of this embodiment determines an assist power (target assist power) to be applied to the steering system, on the basis of the steering torque τ and the vehicle speed V, and then, in order to generate the target assist power in the motor 12, executes current control based on each of the detected phase current values Iu, Iv and Iw and rotational angle θ to generate the above-mentioned motor control signal.

Specifically, the microcomputer 17 is provided with a current command value computing part 23 that functions as the current command value computing means that computes a current command value as a control target value of the assist power applied to the steering system, that is, the motor torque. The microcomputer 17 is also provided with a motor control signal generating part 24 that functions as the motor control signal generating means for generating a motor control signal on the basis of the current command value computed by the current command value computing part 23.

The current command value computing part 23 computes a q-axis current command value Iq* of a d/q coordinate system as the current command value corresponding to the control target value of the motor torque, on the basis of the steering torque τ and the vehicle speed V that are detected by the torque sensor 14 and the vehicle speed sensor 15, respectively. The current command value computing part 23 then outputs the q-axis current command value Iq* to the motor control signal generating part 24. The q-axis current command value Iq* that is output by the current command value computing part 23 is input to the motor control signal generating part 24. The phase current values Iu, Iv and Iw detected by the current sensor 21u, 21v and 21w respectively and the rotational angle θ detected by the rotational angle sensor 22 are also input to the motor control signal generating part 24. The motor control signal generating part 24 then generates a motor control signal by executing current feedback control in the d/q coordinate system on the basis of these phase current values Iu, Iv and Iw and the rotational angle θ (electrical angle).

More specifically, the motor control signal generating part 24 of this embodiment has a first current controller 24a that computes three phase voltage command values Vu*, Vv* and Vw* by executing the current feedback control (d/q axis current F/B) in the d/q coordinate system. At normal times, the motor control signal is generated based on the phase voltage command values Vu*, Vv* and Vw* computed by the first current controller 24a.

Figure 3:
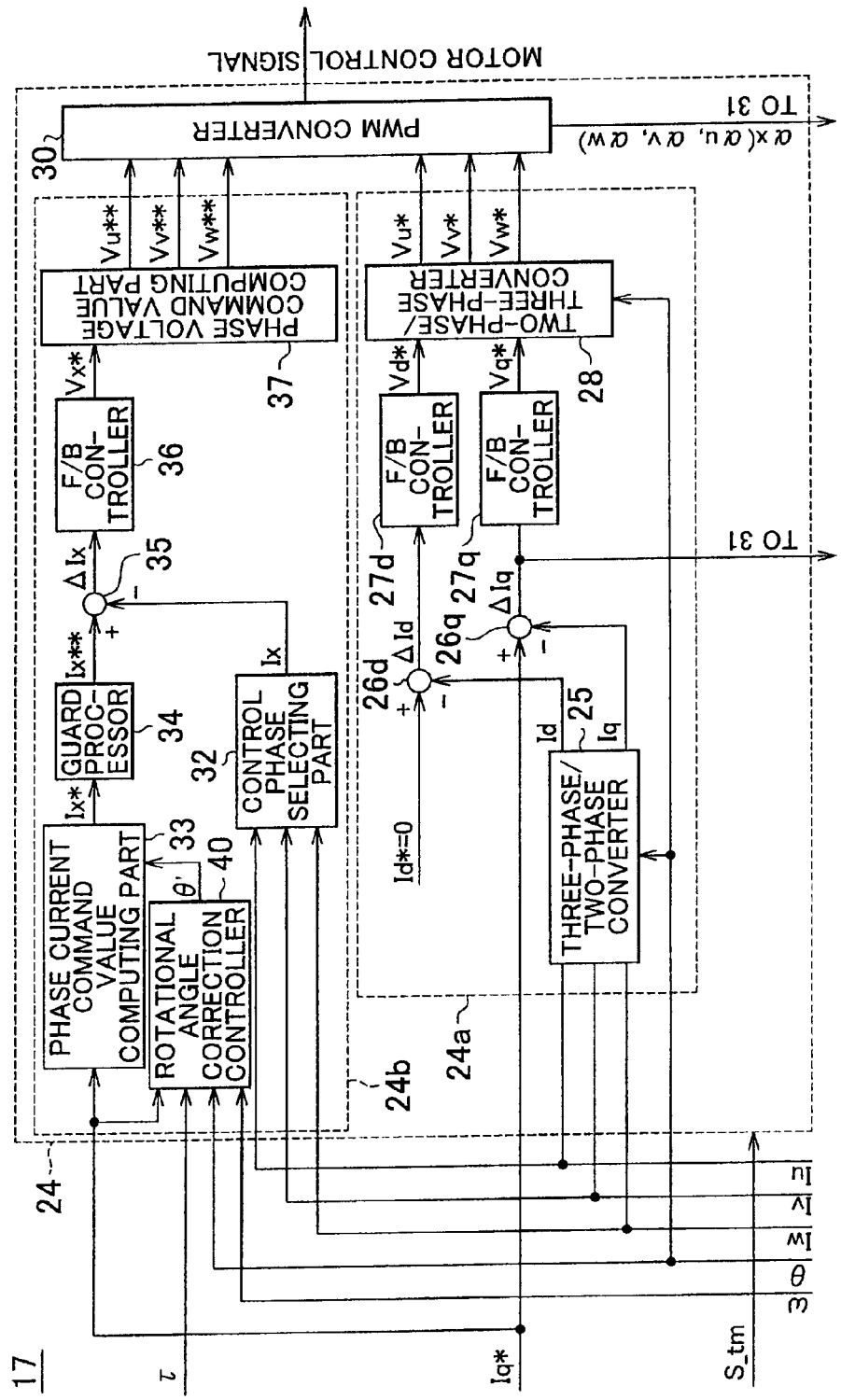
FIG. 3 is a control block diagram of a microcomputer (a motor control signal generating part)

As shown in FIG. 3, the phase current values Iu, Iv and Iw that are input to the first current controller 24a are input to a three-phase/two-phase converter 25 along with the rotational angle θ, and then converted to a d-axis current value Id and a q-axis current value Iq of the d/q coordinate system by the three-phase/two-phase converter 25. The q-axis current value Iq is input to a subtracter 26q along with the q-axis current command value Iq* that is input from the current command value computing part 23, while the d-axis current value Id is input to a subtracter 26d along with the d-axis current command value Id* (Id*=0).

A d-axis current variation ΔId and a q-axis current variation ΔIq that are computed by the subtracters 26d, 26q respectively are input to corresponding F/B controllers 27d, 27q. The F/B controllers 27d, 27q then perform feedback control for making the d-axis current value Id and q-axis current value Iq, which are actual current values, follow the d-axis current command value Id* and q-axis current command value Iq* output by the current command value computing part 23.

Specifically, the F/B controllers 27d, 27q compute a d-axis voltage command value Vd* and q-axis voltage command value Vq* by multiplying the input d-axis current variation ΔId and q-axis current variation ΔIq by a predetermined F/B gain (PI gain). These computed d-axis voltage command value Vd* and q-axis voltage command value Vq* are input to a two-phase/three-phase converter 28 along with the rotational angle θ and converted into the three phase voltage command values Vu*, Vv* and Vw*, respectively, by the two-phase/three-phase converter 28. The first current controller 24a then outputs these phase voltage command values Vu*, Vv* and Vw* to a PWM converter 30.

The PWM converter 30 generates duty command values αu, αv and αw on the basis of these input phase voltage command values Vu*, Vv* and Vw* and further generates a motor control signal having an ON duty ratio indicated by each of the duty command values αu, αv and αw. Thereafter, as shown in FIG. 2, the microcomputer 17 outputs the motor control signal generated by the motor control signal generating part 24 to each of the switching elements (gate terminals thereof) constructing the drive circuit 18, thereby activating the drive circuit 18, that is, controlling supply of the drive power to the motor 12.

How control is performed when an abnormality is occurring will now be described. As shown in FIG. 2, in the ECU 11 of this embodiment, the microcomputer 17 is provided with an abnormality determining part 31 for identifying the type of an abnormality upon occurrence of any abnormality in the EPS 1. The ECU 11 (microcomputer 17) changes a control mode of the motor 12 according to the type of the abnormality identified (determined) by the abnormality determining part 31.

In other words, an abnormality signal S_tr for detecting an abnormality in a mechanical system of the EPS actuator 10 is input to the abnormality determining part 31, and the abnormality determining part 31 detects an abnormality in the mechanical system of the EPS 1 on the basis of the input abnormality signal S_tr. Moreover, the detected phase current values Iu, Iv and Iw, rotational angular velocity ω, the q-axis current variation ΔIq computed by the motor control signal generating part 24 (first current controller 24a), and the duty command values αu, αv and αw of the respective phases are input to the abnormality determining part 31. The abnormality determining part 31 then determines the occurrence of an abnormality in a control system on the basis of these state quantities.

Specifically, the abnormality determining part 31 of this embodiment monitors the q-axis current variation ΔIq in order to determine the occurrence of an abnormality associated with the entire control system, such as a failure of the torque sensor 14 or the drive circuit 18. Specifically, the abnormality determining part 31 compares the q-axis current variation ΔIq with a predetermined threshold value and, when the q-axis current variation ΔIq becomes equal to or greater than the threshold value (for at least a predetermined period of time), determines that an abnormality occurs in the control system.

The abnormality determining part 31 further determines the occurrence of a phase having an electrification failure caused by disconnection of power lines (including a motor coil) or a contact failure in the drive circuit 18, on the basis of the phase current values Iu, Iv and Iw, the rotational angular velocity ψ, and the duty command values αu, αv and αw of the respective phases. When a phase current value Ix of an X phase (X=U, V, W) is a predetermined value $I_{th}$ or lower ($|Ix| \leq I_{th}$) and the rotational angular velocity ω is within a range for determining the disconnection ($|\omega| \leq \omega 0$), the phase having an electrification failure is determined by determining whether or not a situation continues in which a duty command value αx corresponding to this X phase is within a predetermined range ($\alpha Lo \leqq \alpha x \leqq \alpha Hi$) corresponding to the predetermined value $I_{th}$ and the threshold value $\omega 0$ defining the determination range.

The predetermined value $I_{th}$, which is the threshold value of the phase current value Ix, is set at a value in the vicinity of "0," and the threshold value $\omega 0$ of the rotational angular velocity $\omega$ is set at a value equivalent to the maximum number of revolutions of the motor. The threshold values ($\alpha Lo$, $\alpha Hi$) are set at a value smaller than a lower limit and a value larger than an upper limit, respectively, that are taken by the duty command value $\alpha x$ in normal control.

Figure 4:
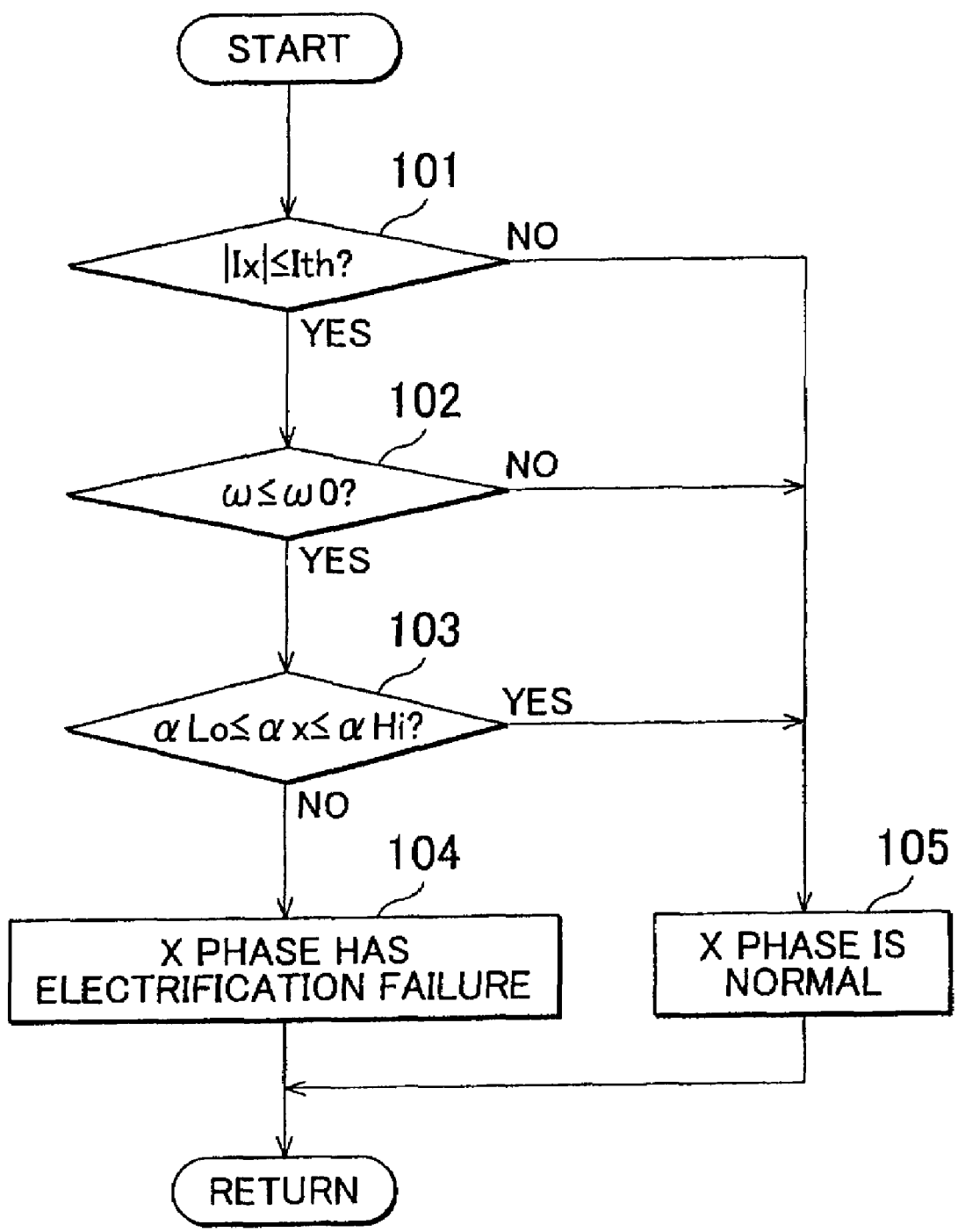
FIG. 4 is a flowchart showing a procedure for detecting a phase having an electrification failure.

Specifically, as shown in the flowchart of FIG. 4, the abnormality determining part 31 determines whether the phase current value Ix (absolute value thereof) to be detected is the predetermined value $I_{th}$ or lower (step 101). When the phase current value Ix is the predetermined value $I_{th}$ or lower ($|Ix| \leqq I_{th}$, step 101: YES), the abnormality determining part 31 determines whether the rotational angular velocity $\omega$ (absolute value thereof) is the predetermined threshold value $\omega 0$ or lower (step 102). When the rotational angular velocity $\omega$ is the predetermined threshold value $\omega 0$ or lower ($|\omega| \leqq \omega 0$, step 102: YES), the abnormality determining part 31 determines whether the duty command value $\alpha x$ is within the abovementioned predetermined range ($\alpha Lo \leqq \alpha x \leqq \alpha Hi$) (step 103). When the duty command value $\alpha x$ is not within this predetermined range (step 103: NO), the abnormality determining part 31 determines that an electrification failure is occurring in the X phase (step 104).

When the phase current value Ix is larger than the predetermined value $I_{th}$ ($|Ix| > I_{th}$, step 101: NO), or when the rotational angular velocity $\omega$ is larger than the threshold value $\omega 0$ ($|\omega| > \omega 0$, step 102: NO), or when the duty command value $\alpha x$ is within the abovementioned predetermined range ($\alpha Lo \leqq \alpha x \leqq \alpha Hi$, step 103: YES), the abnormality determining part 31 determines that no electrification failure is occurring in the X phase (that the X phase is normal, step 105).

Specifically, when an electrification failure (disconnection) occurs in the X phase (any of the U, V and W phases), the phase current value Ix of this phase becomes "0." Here, when the phase current value Ix of the X phase becomes "0" or "a value in the vicinity of 0," the following two cases can happen in addition to such disconnection.

Specifically, there are the cases where the rotational angular velocity of the motor reaches the maximum number of revolutions, and where the current command itself is approximately "0." In consideration of these cases, in this embodiment, first, the phase current value Ix of the X phase to be subjected to the determination is compared with the predetermined value $I_{th}$ in order to determine whether the phase current value Ix is "0" or not. Then, when it is determined that the phase current value Ix is "0" or "a value in the vicinity of 0," it is determined whether one of the above-described two cases applies where there is no disconnection and the phase current value Ix is "0" or "a value in the vicinity of 0." When none of the two cases applies, it is determined that disconnection is occurring in the X phase.

More specifically, when the output duty command value $\alpha x$ is extreme in spite of the rotational angular velocity $\omega$ that is not high enough to make the phase current value Ix become equal to or lower than the predetermined value $I_{th}$ in the vicinity of "0," it can be determined that an electrification failure is occurring in the X phase. Moreover, this embodiment is so structured to identify the phase having an electrification failure, by executing the above-described determination sequentially on the U, V and W phases.

Although not shown in the flowchart of FIG. 4 for convenience of explanation, the determination described above is performed based on the assumption that the source voltage is at least a specified voltage required to drive the motor 12. In addition, final determination for detecting an abnormality is performed depending on whether the situation determined by the predetermined step 104 as that an electrification failure is occurring lasts for a predetermined period of time or longer.

In this embodiment, the ECU 11 (microcomputer 17) switches the control mode of the motor 12 on the basis of the result of the abnormality determination performed by the abnormality determining part 31. Specifically, the abnormality determining part 31 outputs the result of the abnormality determination including the abovementioned electrification failure detection in the form of an abnormality detection signal S_tm. The current command value computing part 23 then computes a current command value corresponding to this abnormality detection signal S_tm to be input, and the motor control signal generating part 24 generates a motor control signal corresponding to the same. As a result, the microcomputer 17 can switch the control mode of the motor 12.

More specifically, the ECU 11 of this embodiment has three control modes: "normal control mode," which is a control mode for a normal state; "assist suspension mode," which is a control mode used when an abnormality for which drive of the motor 12 should be suspended is occurring; and "two phase drive mode," which is a control mode used when an electrification failure occurs in any of the phases of the motor 12. When the abnormality detection signal S_tm output by the abnormality determining part 31 corresponds to the "normal control mode," the current command value computing part 23 computes a current command value for the normal state, and the motor control signal generating part 24 generates a relevant motor control signal.

On the other hand, when the abnormality detection signal S_tm output by the abnormality determining part 31 corresponds to the "assist suspension mode," the current command value computing part 23 computes a current command value and the motor controls signal generating part 24 generates a motor control signal, in order to suspend the drive of the motor 12. Examples of the situations where the "assist suspension mode" is selected include a situation where an abnormality occurs in the mechanical system or the torque sensor 14, and a situation where an excess current is generated when an abnormality occurs in a power supply system. The situations where "assist suspension mode" is selected further include a situation where the drive of the motor 12 needs to be suspended immediately, and a situation where the drive of the motor 12 needs to be stopped after gradually reducing the outputs of the motor 12, that is, gradually reducing the assist power. In the latter case, the motor control signal generating part 24 gradually reduces the value (absolute value) of the q-axis current command value Iq* that is output as the current command value. After stopping the motor 12, the microcomputer 17 brings each of the switching elements constructing the drive circuit 18 into an open state, and opens a power source relay, which is not shown.

The abnormality detection signal S_tm corresponding to the "two phase drive mode" has information required to identify the phase having an electrification failure. When the abnormality detection signal S_tm output by the abnormality determining part 31 corresponds to the "two phase drive mode," the motor control signal generating part 24 generates a motor control signal so as to continuously drive the motor with the two electrification phases other than the phase with an electrification failure.

In other words, as shown in FIG. 2, in addition to the first current controller 24a that computes the phase voltage command values Vu*, Vv* and Vw* by executing the current feedback control in the d/q coordinate system, the motor control signal generating part 24 of this embodiment has a second current controller 24b that computes phase voltage command values Vu, Vv and Vw by executing phase current feedback control. When the abnormality detection signal S_tm input from the abnormality determining part 31 corresponds to the "two phase drive mode," the ECU 11 outputs a motor control signal on the basis of the phase voltage command values Vu, Vv and VW computed by the second current controller 24b.

More specifically, as shown in FIG. 3, the second current controller 24b of this embodiment is provided with a control phase selecting part 32 for selecting one of the remaining two phases other than the detected phase with an electrification failure, as a control phase, and a phase current command value computing part 33 that computes a phase current command value Ix* (X=any of U, V and W) of the phase selected as the control phase. By executing the phase current feedback control on the basis of the difference between the phase current value Ix and the phase current command value Ix* (Ix) of the control phase, the phase voltage command values Vu, Vv and Vw to drive the motor with the two electrification phases other than the phase with an electrification failure are computed.

Concretely, The phase current command value Ix* output by the phase current command value computing part 33 is input to a guard processor 34. The phase current command value Ix* is subjected to guard processing, and a resultant phase current command value Ix is input to a subtracter 35 along with the phase current value Ix of the phase that is selected as the control phase by the control phase selecting part 32. The subtracter 35 then computes a phase current variation ΔIx by subtracting the phase current value Ix from the phase current command value Ix and outputs the computed phase current variation ΔIx to a F/B controller 36. The F/B controller 36 multiplies the input phase current variation ΔIx by the predetermined F/B gain (PI gain), thereby computing a phase voltage command value Vx* of the control phase.

The phase voltage command value Vx* computed by the F/B controller 36 is input to a phase voltage command value computing part 37. The phase voltage command value computing part 37 then computes the phase voltage command values Vu, Vv and VW** based on the phase voltage command value Vx* of the control phase.

Specifically, the phase with an electrification failure cannot be electrified and the phases (angular phases) of the electrification phases are shifted relative to each other by π (180°) during two phase drive. Therefore, while the phase voltage command value of the phase having an electrification failure is "0," the phase voltage command value of the other electrification phase can be computed by inverting the sign of the phase voltage command value Vx* associated with the control phase. The second current controller 24b of this embodiment then outputs the phase voltage command values Vu, Vv and Vw computed in this way to the PWM converter 30**.

Here, during two phase drive, the phase current command value computing part 33 of this embodiment computes the phase current command value Ix* that generates a motor current (q-axis current value Iq) corresponding to the control target value of a requested torque, i.e., the motor torque (q-axis current command value Iq*), except for predetermined rotational angles corresponding to the phase with an electrification failure.

Specifically, in accordance with the phase with an electrification failure, the phase current command value computing part 33 computes the phase current command value Ix* of one of the remaining two phases on the basis of the following equations (1) to (3).

When the U phase has an electrification failure:

$$I_v^* = \frac{I_q^*}{\sqrt{2}\cos\theta} \quad (1)$$

When the V phase has an electrification failure:

$$I_u^* = \frac{-I_q^*}{\sqrt{2}\sin\left(\theta - \frac{\pi}{6}\right)} \quad (2)$$

When the W phase has an electrification failure:

$$I_v^* = \frac{I_q^*}{\sqrt{2}\sin\left(\theta + \frac{\pi}{6}\right)} \quad (3)$$

Figure 5:
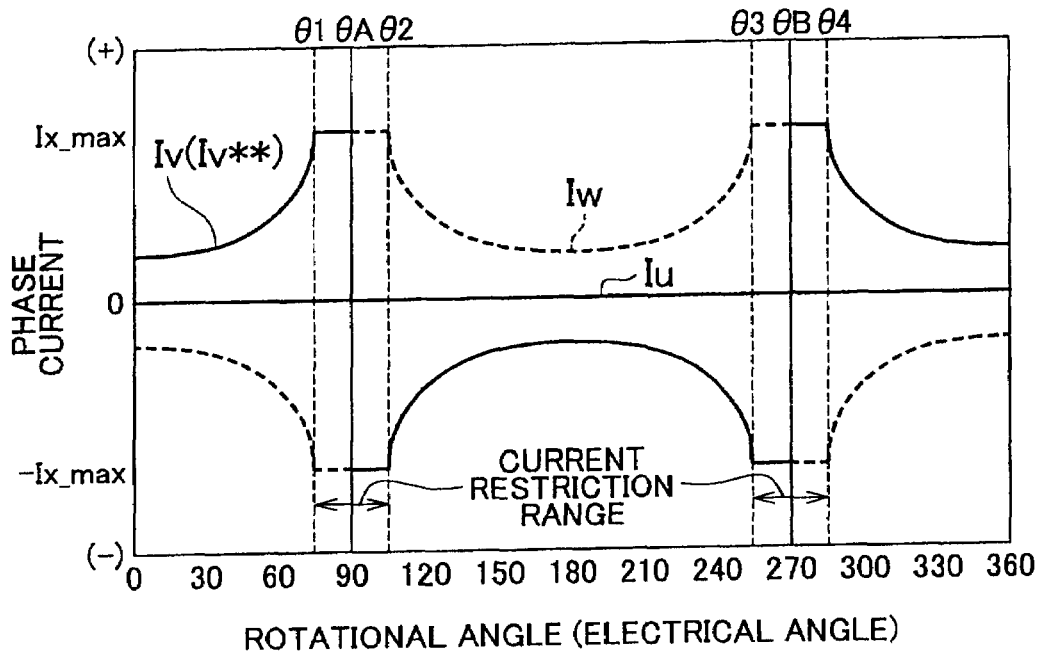
FIG. 5 is an explanatory diagram showing how each phase current changes during two phase drive (when a U phase has an electrification failure)

Specifically, using the above equations (1) to (3), the phase current command value Ix* is computed that changes in the form of a secant curve (inverse of cos θ (secant: sec θ)) or a cosecant curve (inverse of sin θ (cosecant: cosec θ)) of which asymptotic lines are the lines on which the rotational angles are predetermined rotational angles θA, θB corresponding to the phase having an electrification failure (see FIG. 5). Thereafter, the phase current feedback control is executed based on the phase current command value Ix* that changes in the form of a secant curve or a cosecant curve. As a result, theoretically, the motor current (q-axis current value Iq) corresponding to the requested torque (q-axis current command value Iq*) can be generated, except for the predetermined rotational angles θA, θB corresponding to these asymptotic lines.

Figure 6:
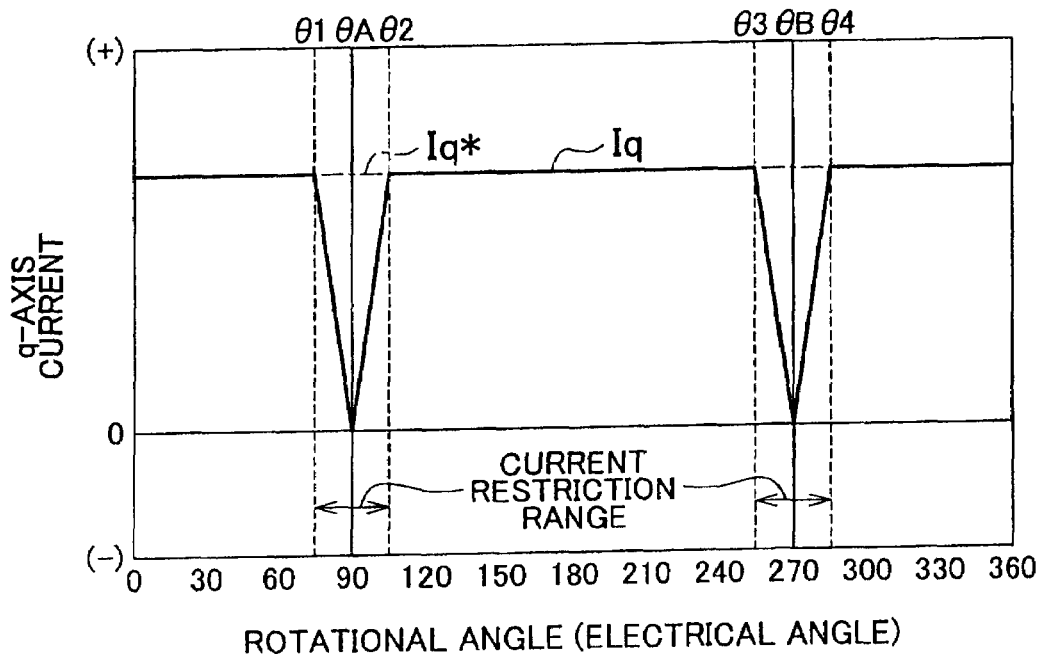
FIG. 6 is an explanatory diagram showing how q-axis current changes during two phase drive (when a U phase has an electrification failure)

FIGS. 5 and 6 show examples where the U phase is the phase with an electrification failure and the V and W phases are the two electrification phases, wherein the smaller rotational angle out of the two rotational angles corresponding to the abovementioned asymptotic lines is taken as the rotational angle θA, and the larger rotational angle as the rotational angle θB, in an electrical angle range of 0° to 360°. In this case, the rotational angles θA, θB are "90°" and "270°" respectively. When the V phase is the phase with an electrification failure, the predetermined rotational angles θA, θB become "30°" and "210°" respectively. When the W phase is the phase with an electrification failure, the predetermined rotational angles θA, θB become "150°" and "330°" respectively (not shown).

In actuality, the amount of current (absolute values) that can be applied to motor coils 12u, 12v and 12w of the respective phases is limited. In this embodiment, therefore, the guard processor 34 executes the guard processing to restrict the phase current command value Ix* provided by the phase current command value computing part 33 within a predetermined range (−Ix_max≦Ix*≦Ix_max). Note that "Ix_max" is the value of the maximum current applied to the X phase (U, V, or W phase), and this maximum value is determined based on, for example, a rated current of each of the switching elements constructing the drive circuit 18. Therefore, within a range where the guard processing is performed (current restriction range: θ1<θ<θ2, θ3<θ<θ4), the phase current command value Lx** obtained as a result of the guard processing becomes constant at its upper limit (Ix_max) or lower limit (−Ix_max) that can be applied to the motor coils.

Specifically, during two phase drive, the microcomputer 17 of this embodiment executes the phase current feedback control in order to supply each electrification phase with a phase current that changes in the form of a secant curve or a cosecant curve, thereby generating the motor current corresponding to the requested torque, except for the current restriction range (θ1<θ<θ2, θ3<θ<θ4) set around the predetermined rotational angles θA, θB corresponding to the asymptotic lines. Accordingly, even when an electrification failure occurs, the assist power can be applied continuously while maintaining good steering feeling, without generating a significant torque ripple.

Figure 7:
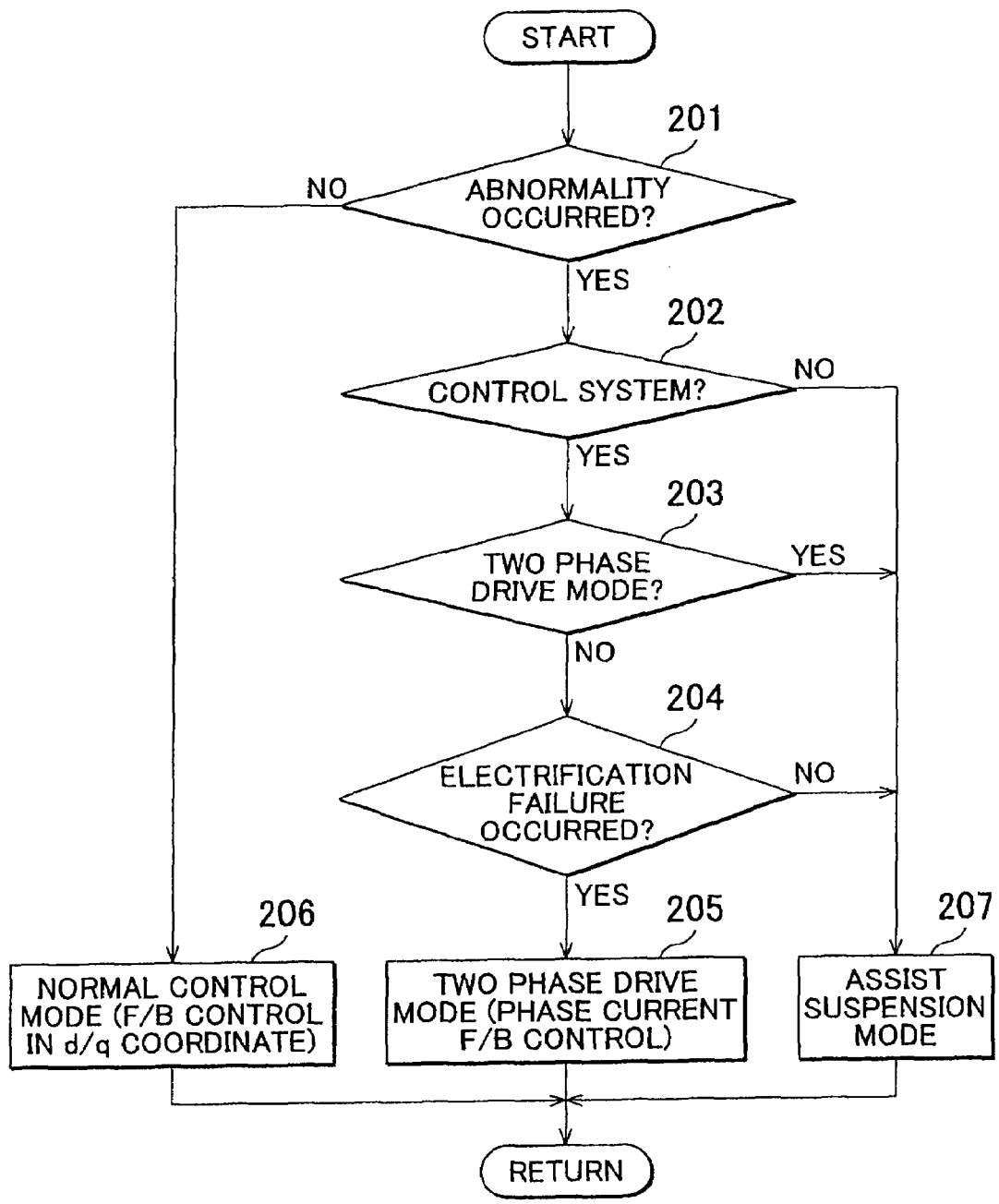
FIG. 7 is a flowchart showing a procedure for determining an abnormality and switching a control mode.

Next are described the procedures for the abnormal determination, switching of the control modes, and generation of motor control signal during two phase drive, which are performed by the microcomputer. As shown in the flowchart of FIG. 7, the microcomputer 17 first determines whether any abnormality is occurring (step 201). When determining that an abnormality is occurring (step 201: YES), the microcomputer 17 then determines whether the abnormality is occurring in the control system (step 202). Next, when it is determined in step 202 that the abnormality is occurring in the control system (step 202: YES), the microcomputer 17 determines whether the present control mode is the two phase drive mode (step 203). When the present control mode is not the two phase drive mode (step 203: NO), the microcomputer 17 determines whether the abnormality of the control system means the occurrence of the phase having an electrification failure (step 204). When it is determined that the phase with an electrification failure occurs (step 204: YES), the microcomputer 17 executes output of a motor control signal where the remaining two phases other than the phase with an electrification failure are electrification phases (two phase drive mode, step 205).

As described above, the output of the motor control signal in the two phase drive mode is executed by computing the phase current command value that changes in the form of a secant curve or a cosecant curve based on the asymptotic lines, on which the rotational angles are the predetermined rotational angles θA, θB corresponding to the phase having an electrification failure, and executing the phase current feedback control based on this phase current command value.

Figure 8:
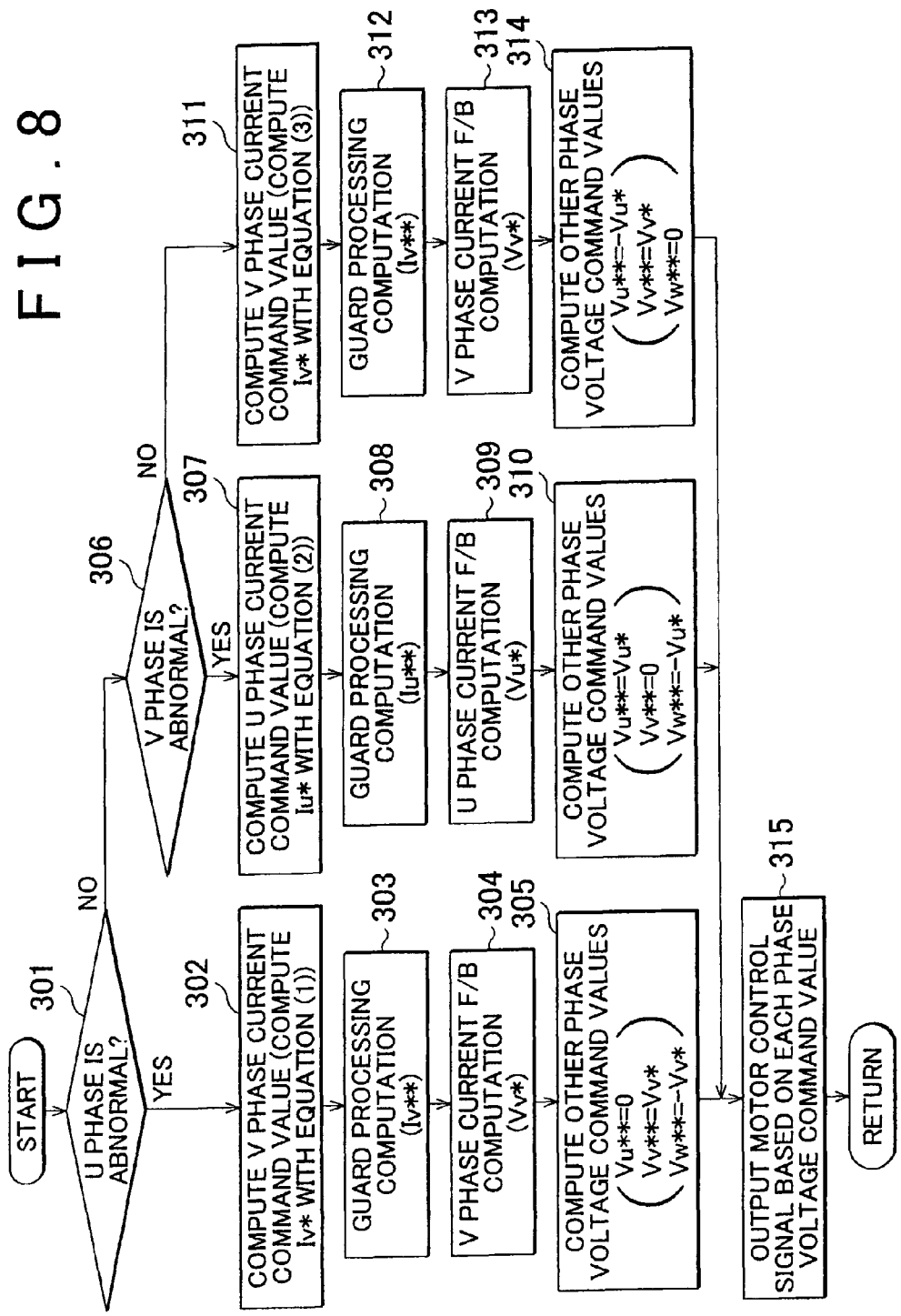
FIG. 8 is a flowchart showing a procedure for generating a motor control signal during two phase drive.

Specifically, as shown in the flowchart of FIG. 8, the microcomputer 17 determines whether the phase with an electrification failure is the U phase (step 301). When the phase with an electrification failure is the U phase (step 301: YES), the microcomputer 17 computes the phase current command value Iv* for the V phase on the basis of the above equation (1) (step 302). The microcomputer 17 then executes guard processing computation on the phase current command value Iv* and restricts the resultant phase current command value Iv** within a predetermined range (step 303). The microcomputer 17 thereafter computes the phase voltage command value Vv* for the V phase by executing the phase current feedback control on the basis of this phase current command value Iv (step 304), and computes the phase voltage command values Vu, Vv and Vw for the respective phases on the basis of the phase voltage command value Vv* (Vu=0, Vv=Vv*, Vw**=−Vv*, step 305).

On the other hand, when it is determined in step 301 that the phase with an electrification failure is not the U phase (step 301: NO), the microcomputer 17 determines whether the phase with an electrification failure is the V phase (step 306).

When the phase with an electrification failure is the V phase (step 306: YES), the microcomputer 17 computes the phase current command value Iu* for the U phase on the basis of the above equation (2) (step 307). Next, the microcomputer 17 executes the guard processing computation on the phase current command value Iu* and restricts the resultant phase current command value Iu within a predetermined range (step 308). The microcomputer 17 then executes the phase current feedback control on the basis of the resultant phase current command value Iu (step 309), and then computes the phase voltage command values Vu, Vv and Vw** for the respective phases on the basis of the phase voltage command value Vu* computed by the execution of the phase current feedback control (Vu**=Vu*, Vv=0, Vw=−Vu*, step 310).

When it is determined in step 306 that the phase with an electrification failure is not the V phase (step 306: NO), the microcomputer 17 computes the phase current command value Iv* for the V phase on the basis of the above equation (3) (step 311), executes the guard processing computation, and then restricts the resultant phase current command value Iv within a predetermined range (step 312). The microcomputer 17 then executes the phase current feedback control on the basis of the resultant phase current command value Iv (step 313), and computes the phase voltage command values Vu and Vw for the remaining two phases (V and W phases) on the basis of the phase voltage command value Vv* computed by the execution of the phase current feedback control (Vu**=−Vv*, Vv**=Vv*, Vw**=0, step 314).

The microcomputer 17 generates the motor control signals based on the phase voltage command values Vu, Vv and Vw** computed in step 305, 310 or 314, and outputs these values to the drive circuit 18 (step 315).

Note that when it is determined in step 201 that there is no abnormality (step 201: NO), the microcomputer 17 executes the output of the motor control signals by executing the current feedback control in the d/q coordinate system, as described above (normal control mode, step 206). When it is determined in step 202 that an abnormality is occurring in a system other than the control system (step 202: NO), or when it is determined in step 203 that the control mode is already the two phase drive mode (step 203: YES), or when it is determined in step 204 that an abnormality other than the occurrence of the phase with an electrification failure is occurring (step 204: NO), the microcomputer 17 shifts the control mode to the assist suspension mode (step 207). Then, the microcomputer 17, for example, outputs the motor control signal for suspending the drive of the motor 12 and opens the power source relay.

Next, how rotational angle correction control during two phase drive according to this embodiment is performed will be described. As shown in FIG. 3, in this embodiment, the second current controller 24b that executes the phase current feedback control during two phase drive to compute the phase voltage command values Vu, Vv, Vw** is provided with a rotational angle correction controller 40 that corrects the rotational angle θ based on which the phase current command value Iv* is generated. The phase current command value computing part 33 receives the rotational angle θ' obtained after the correction in the rotational angle correction controller 40 as well as the q-axis current command value Iq* output by the current command value computing part 23.

Figure 9:
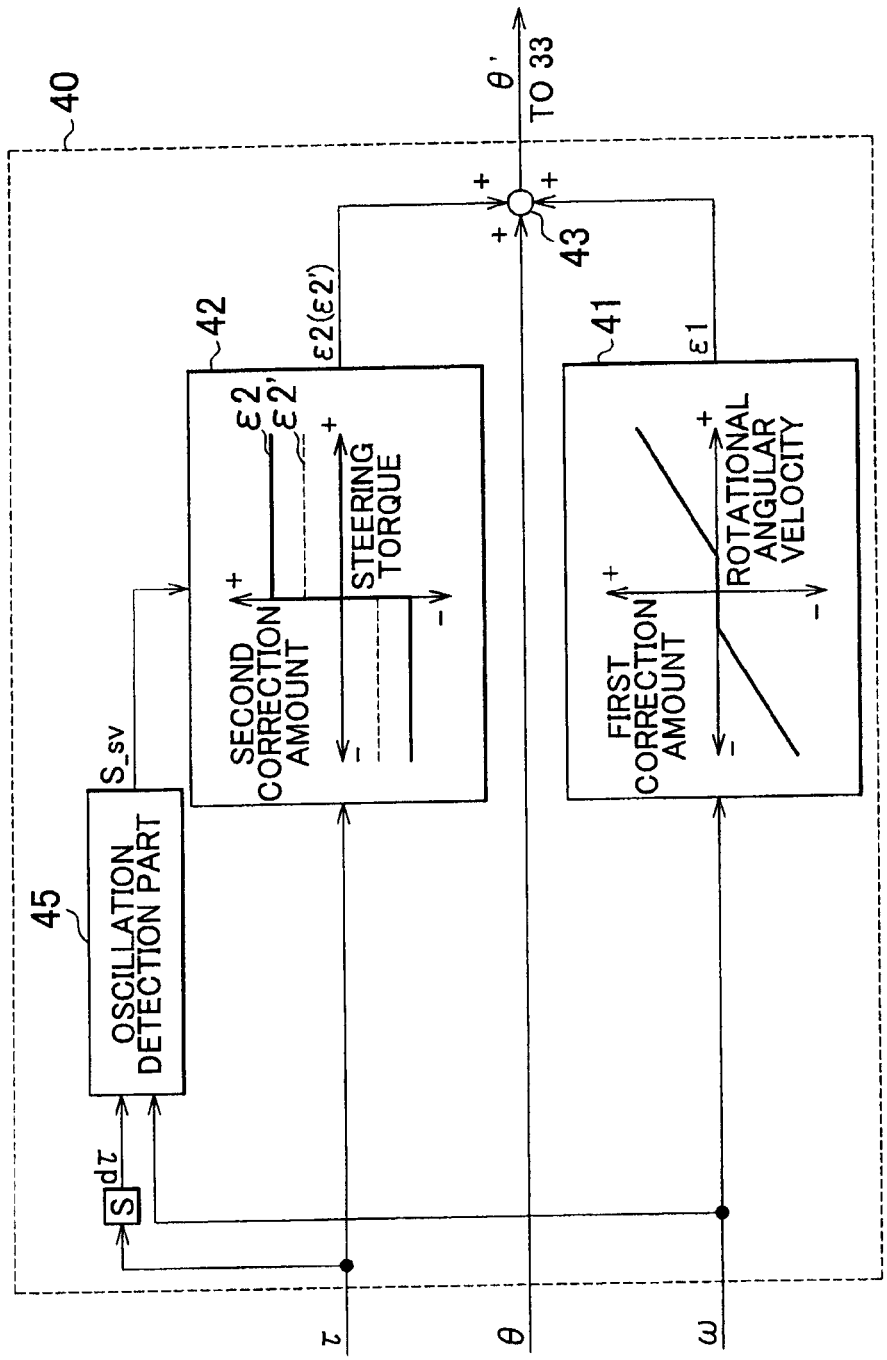
FIG. 9 is a control block diagram of a rotational angle correction controller of a first embodiment.

In other words, as shown in FIG. 9, the rotational angular velocity ω and the steering torque τ are input to the rotational angle correction controller 40 of this embodiment, and the rotational angle correction controller 40 has a first correction amount computing part 41 that computes a first correction amount ϵ1 based on the rotational angular velocity ω and a second correction amount computing part 42 that computes a second correction amount ϵ2 based on the steering torque τ. The rotational angle correction controller 40 executes a correction of the rotational angle θ based on the first correction amount ϵ1 and the second correction amount ϵ2.

Specifically, the first correction amount computing part 41 computes the first correction amount ϵ1 of which the sign (the direction) is the same as that of the input rotational angular velocity ω and of which the absolute value increases as the absolute value of the rotational angular velocity ω increases. More specifically, the first correction amount ϵ1 corrects the rotational angle θ so that the faster the rotational angular velocity ω of the motor 12 is, the greater the amount of advancement of the phase in the "motor rotational direction" is.

With respect to the computation of the first correction amount ϵ1, in the vicinity of "ω=0", that is, in the region in which the influence of "the problem of the phase delay in the feedback control" is small, a so-called "deadband" is set in which the value of the first correction amount ϵ1 does not vary (ϵ1=0) with variation in the rotational angular velocity ω.

The second correction amount computing part 42 computes, as the second correction amount ϵ2, the predetermined value (absolute value) with the sign (direction) the same as that of the steering torque τ input via the steering 2, that is, computes the second correction amount ϵ2 for correcting the rotational angle θ so as to shift the phase in the "steering operation direction (steering direction)."

In this embodiment, the first correction amount ϵ1 and the second correction amount ϵ2 (ϵ2') are input to an adder 43 along with the rotational angle θ detected by the rotational angle sensor 22. The rotational angle correction controller 40 outputs the value as the corrected rotational angle θ', obtained by adding the first correction amount ϵ1 and the second correction amount ϵ2 (ϵ2') to the rotational angle θ, to the phase current command value computing part 33.

Figure 10:
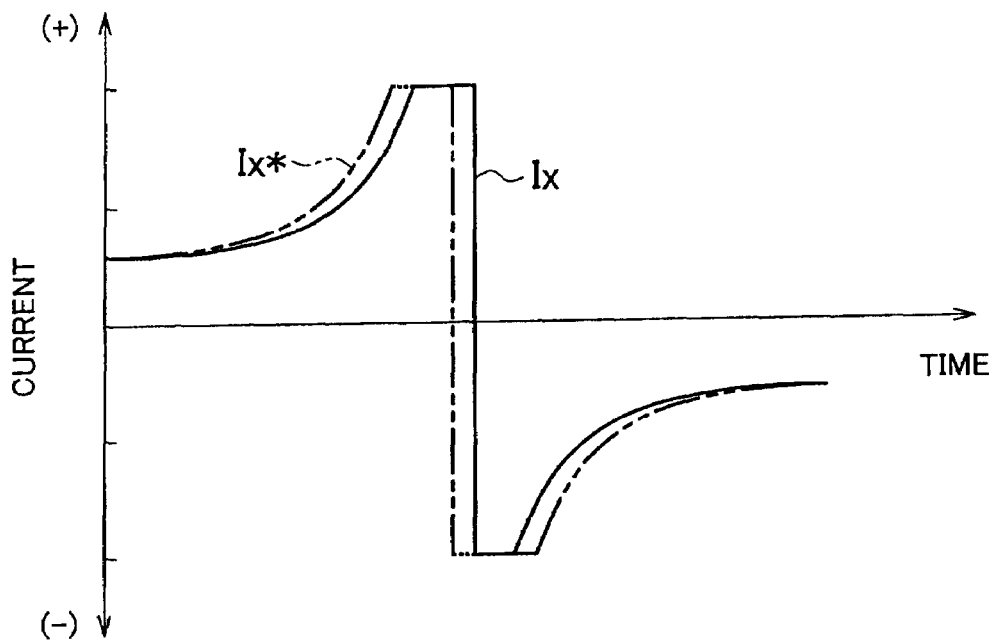
FIG. 10 is an explanatory diagram showing a deviation of a phase of the actual electric current value relative to the current command value.

Next, operations and effects of the above-described rotational angle correction (phase correction) will be described. As described above, during two phase drive, when a configuration is adopted in which a phase current that varies according to a secant curve or a cosecant curve is supplied to each electrification phase, the sign of the phase current value of the electrification phase is inverted at the rotational angles θA and θB corresponding to the asymptotic lines of the secant curve or the cosecant curve (see FIG. 5). Thus, if a phase difference occurs between the phase current command value Ix*, which is the current command value, and the phase current value Ix, which is the actual current value (see FIG. 10), when the rotational angle θ of the motor 12 passes the predetermined rotational angles θA and θB, in the vicinity of each of the predetermined rotational angles θA and θB, a region occurs in which the sign of the current command value of the current control and the sign of the actual current value do not match. Specifically, this means that there are regions in which an electric current that causes the motor 12 to rotate inversely is generated. Thus, due to such an inverse electric current, that is, due to the assist torque (inverse assist torque) of which the direction is inverse to the steering direction, smooth rotation of the motor 12 is impeded, which can result in the deterioration in the steering feeling.

Specifically, in a current feedback control, there is a tendency that the phase of the actual current delays relative to the phase of the current command value because temporal delays exist, which include, for example, the delay due to mechanical factors, such as the backlash in the motor, computation delay, and the phase delay of the current control. The phase delay increases as the rotational angular velocity of the motor increases.

In consideration of this fact, the rotational angle correction controller 40 of this embodiment is designed to add, to the rotational angle θ that is detected by the rotational angle sensor 22 and input to the rotational angle correction controller 40, the first correction amount ϵ1 for correcting the rotational angle θ so that the higher the rotational angular velocity ω (absolute value thereof) of the motor 12 is, the greater the amount of advancement of the phase in the "motor rotational direction" is.

The higher the rotational angular velocity ω is, the greater the phase delay in the electric current feedback control is. Thus, when the rotational angle correction is performed that advances the phase in the steering direction (motor rotational direction) in order to compensate the phase delay according to the rotational angular velocity ω, it is possible to reduce the regions in which the sign of the current command value and the sign of the actual current value do not match each other when the rotational angle α of the motor 12 passes the predetermined rotational angles θA and θB corresponding to the asymptotic lines. In this way, an electric power steering device is obtained in which, "when the steering direction matches the motor rotational direction," the occurrence of the electric current that causes the motor 12 to rotate inversely, that is, the occurrence of the inverse assist torque, which is caused by the occurrence of the phase delay, is suppressed, and smooth rotation of the motor is secured.

Meanwhile, when the addition of such a first correction amount ϵ1 is effective, that is, during normal steering operation where "the steering direction matches the motor rotational direction," the correction of the rotational angle θ performed by adding the second correction amount ϵ2 substantially means the "raising" of the level of the correction performed by adding the first correction amount ϵ1.

However, the correction of the rotational angle θ performed by adding the second correction amount ϵ2 having "the value that shifts the phase in the steering direction" according to the direction (sign) of the steering torque τ has another important role under certain conditions that is necessary to achieve good steering feeling during two phase drive.

Specifically, as described above, in this embodiment, during two phase drive, the current control is performed for restricting the phase current command value Ix* within the predetermined range (−Ix_max≦Ix*≦Ix_max), in order to prevent the phase current command value Ix* changing in the form of a secant curve or a cosecant curve from generating the occurrence of the phase current value Ix that exceeds the acceptable range of the power supply line or each switching element. Therefore, in the current restriction range (θ1<θ<θ2, θ3<θ<θ4) that is set around the predetermined rotational angles θA, θB corresponding to the asymptotic lines, the value of the phase current command value Ix* (phase current value Lx) becomes constant at its upper limit (Ix_max) or lower limit (−Ix_max) that can be applied to the motor coils (see FIG. 5).

However, when the motor control is performed by applying the abovementioned phase current that changes in the form of a secant curve or a cosecant curve, theoretically, the absolute value of the phase current value Ix needs to be increased to infinity in the vicinity of the predetermined rotational angles θA, θB in order to generate a constant motor torque. Therefore, when the above-described current restriction is executed, the generated motor torque falls below an assist power target value in the current restriction range; which might interfere with smooth motor rotation.

Figure 11:
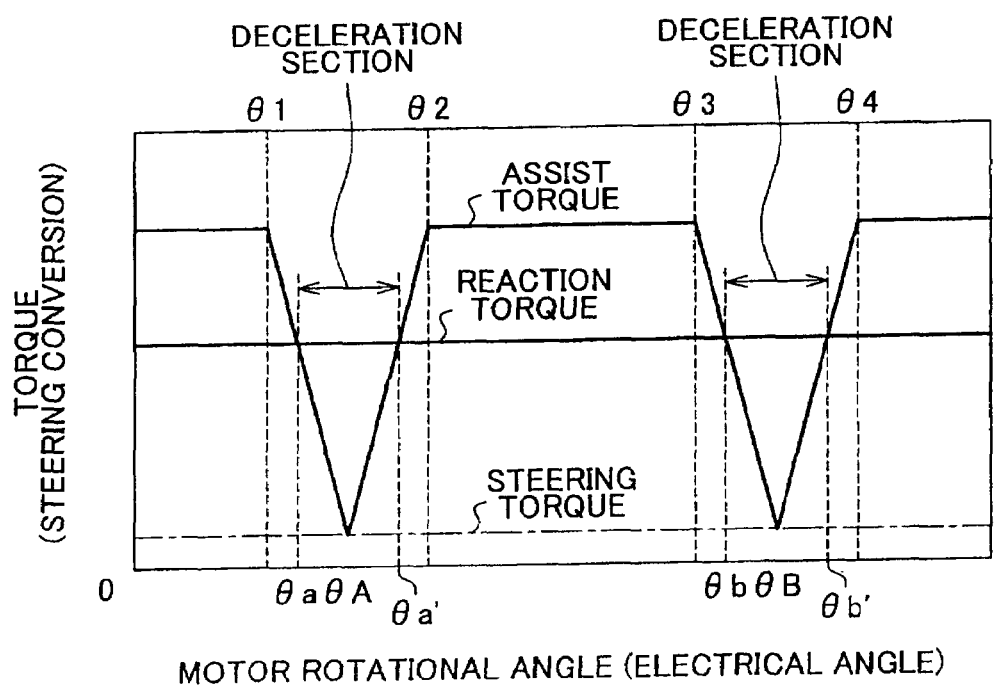
FIG. 11 is an explanatory diagram showing deceleration sections in the vicinity of predetermined rotational angles corresponding to the asymptotic lines where the directions of corresponding phase currents are switched.

Specifically, as shown in FIG. 11, during two phase drive, due to a decrease in the motor torque (assist torque) caused by the current restriction, a section where the torque in the steering direction (the sum of the steering torque and the assist torque) falls below a reaction torque in a return direction exists in the vicinity of the predetermined rotational angles θA, θB. In such a section, the steering speed decreases due to the decrease in the torque in the steering direction caused by the current restriction (deceleration section: θa<θ<θa', θb<θ<θb').

When the velocity of entry into the deceleration section is "ωin," the velocity of escaping the deceleration section is "ωout," a motor inertia is "Jm," and the deceleration energy in this deceleration section is "−En," the following equation (4) is established based on the energy conservation law.

$$\frac{1}{2}J_m\omega_{out}^2 - \frac{1}{2}J_m\omega_{in}^2 = -E_n \quad (4)$$

The "velocity of entry" in this case indicates the value of the rotational angular velocity ω at the rotational angle θa obtained when the steering direction is "from the left to the right" in FIG. 11, for example. Similarly, the "velocity of escape" indicates the value of the rotational angular velocity ω at a rotational angle θa'.

Therefore, in order to cause the velocity of escape ωout to exceed "0", that is, in order to cause the motor to pass through the deceleration section without stopping, the velocity of entry ωin needs to be higher than a critical velocity ωcr shown in the following equation (5).

$$\omega_{cr} = \sqrt{\frac{2E_n}{J_m}} \quad (5)$$

Figure 12:
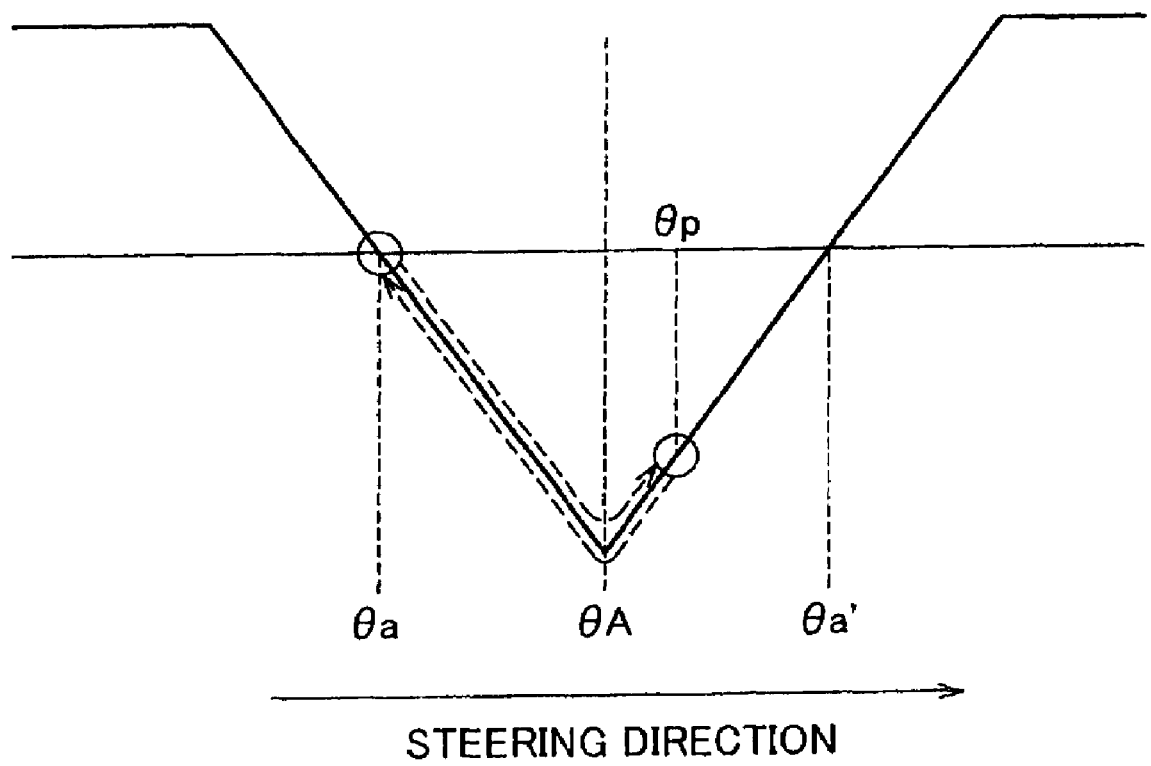
FIG. 12 is an explanatory diagram showing a mechanism of how a steering wheel gets stuck during low-speed steering.

Specifically, as shown in FIG. 12, during low-speed steering (ω≦ωcr) in which the rotational angular velocity ω is equal to or lower than the critical velocity ωcr, the motor cannot pass through the deceleration section, and the rotational angular velocity ω becomes "0" at a rotational angle θp positioned immediately before the rotational angle θa' (that is, positioned on the side closer to the rotational angle θa, which is an entry angle) that is the position of escaping the deceleration section. In this deceleration section, the torque in the return direction (reaction torque) is larger than the torque in the steering direction (the sum of the steering torque and the assist torque) ("steering torque"+"assist torque"<"reaction torque"). Therefore, the motor stops at the rotational angle θp and thereafter rotates inversely in the return direction. Finally, if the steering torque is not particularly changed, the motor stops rotating at the rotational angle θa at which the torque in the steering direction and the torque in the return direction are balanced, that is, there is a fear that a so-called stuck steering wheel is caused.

In consideration of this point, in this embodiment, the second correction amount ε2 that shifts the phase in the steering direction is added to the rotational angle θ in accordance with the direction (sign) of the steering torque τ (see FIG. 9). Specifically, a main object of the correction of the rotational angle θ performed by adding the second correction amount ε2 thereto is to suppress the occurrence of the stuck steering wheel as described above.

Figure 13A:
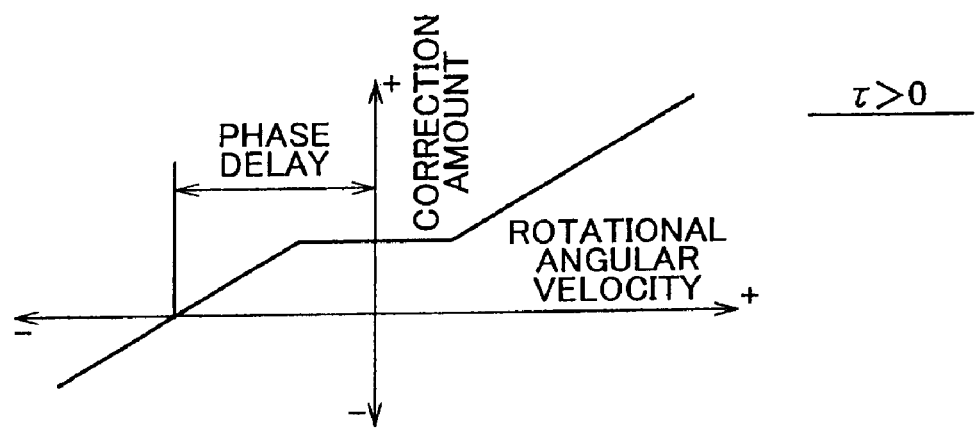
FIGS. 13A and 13B are diagrams showing the relationship between the amount of correction of the rotational angle and the rotational angular velocity for each of the steering directions.
Figure 13B:
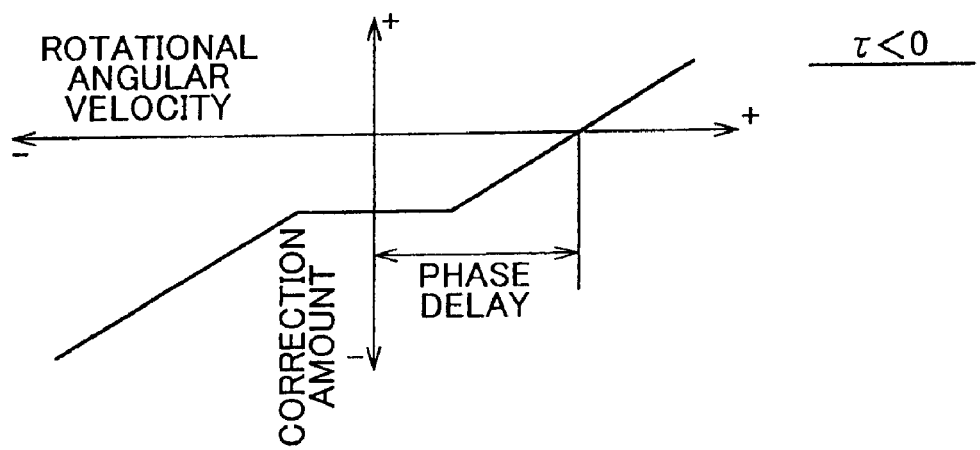

FIGS. 13A and 13B are diagrams showing the sum of the correction amounts (first correction amount ε1 and second correction amount ε2) added to the rotational angle θ in the adder 43 in the rotational angle correction controller 40 (see FIG. 9) for each of the directions (signs) of the steering torque τ.

As shown in FIGS. 13A and 13B, during normal steering operation where the steering direction (the sign of the steering torque τ) matches the motor rotational direction (the sign of the rotational angular velocity ω), basically, the sign of the correction amount is the same as the sign of the rotational angular velocity ω, that is, the phase is advanced in the motor rotational direction.

However, in this embodiment, as described above, the first correction amount ε1 that is computed according to the rotational angular velocity ω and the second correction amount ε2 that is "the value, of which the sign is the same as that of the steering torque τ, that shifts the phase in the steering direction" are computed, and added together (see FIG. 9). Thus, in the region in which the steering direction does not match the motor rotational direction and the rotational angular velocity ω is low, that is, when it is highly likely that the above-described stuck steering wheel is caused, which can lead to a stop of rotation or a inverse rotation of the motor because of the existence of the deceleration section, a correction of the rotational angle is performed so that the phase is delayed with respect to the rotational direction of the motor 12.

The above described problem of "the phase delay in the electric current feedback control" is not particularly problematic in the region in which the rotational angular velocity ω is so low that the stuck steering wheel due to the existence of the deceleration section is caused. Thus, by correcting the rotational angle θ purposely so that the phase is shifted, it is possible to generate an electric current that causes the motor 12 to rotate in the direction opposite to the steering direction, that is, generate an assist torque of which the direction is opposite to the steering direction when the rotational angle θ passes the predetermined rotational angles θA and θB corresponding to the asymptotic lines during low-speed steering. In this embodiment, when the motor 12 stops rotation or rotates inversely due to the existence of the deceleration section, the rotation of the motor 12 is accelerated using the inverse assist torque generated by the rotational angle correction based on such a second correction amount ε2, whereby the occurrence of the above-described stuck steering wheel is suppressed.

Figure 14:
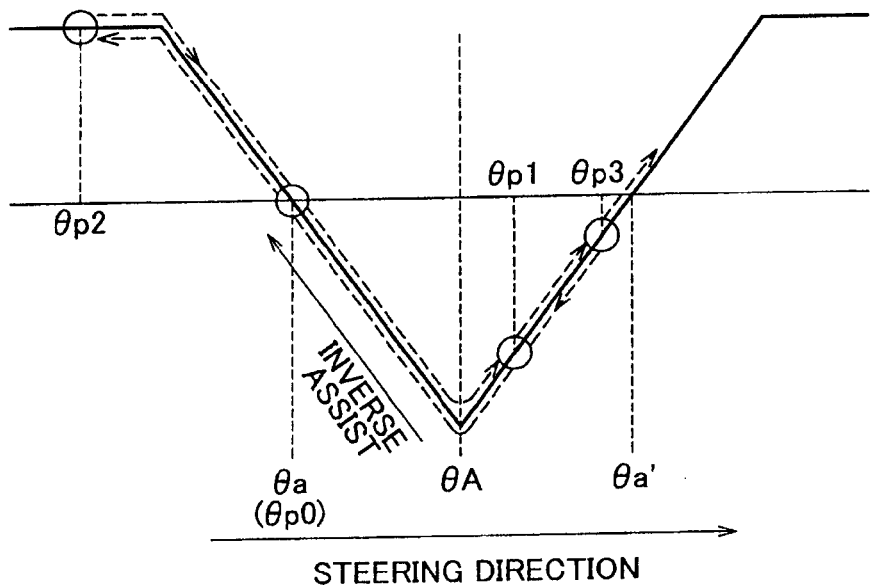
FIG. 14 is an explanatory diagram showing a mechanism of how the rotational speed of the motor is increased by inverse assist.

Specifically, in this embodiment, as shown in FIG. 14, while the motor 12 repeats inversions of rotation in the deceleration section, the energy that is given in the form of the inverse assist torque is converted into the rotational angular velocity ω for achievement of the velocity of entry ωin that exceeds the critical velocity ωcr. Thus, by enabling passing of the deceleration section in this way, the occurrence of the stuck steering wheel is suppressed that significantly deteriorates the rotational follow-up performance of the motor with respect to the steering operation.

Specifically, as shown in FIG. 14, when the velocity of entry ωin into the deceleration section (for example, the rotational angular velocity ω of the rotational angle θa in the figure) is equal to or lower than the critical velocity ωcr, the motor cannot pass the deceleration section. Then, after a stop at a rotational angle θp1, the motor 12 rotates inversely in the return direction. However, by applying the inverse assist torque through the rotational angle correction based on the second correction amount ε2, the position of entry (rotational angle θa (θp0) into the deceleration section is passed at a rotational angular velocity ω higher than the velocity of entry ωin, during inverse rotation. Then, after returning to a rotational angle θp2 that is positioned far from the position of entry in the return direction, the motor 12 rotates in the steering direction again.

At this moment, the steering system is twisted due to the inverse rotation in the return direction, whereby the absolute value of the steering torque τ detected by the torque sensor 14 increases. The motor 12 is then accelerated in the steering direction again by the large assist power computed based on this steering torque τ. As a result, the velocity of entry ωin that is higher than that obtained upon the previous entry can be achieved. Specifically, it is possible to achieve the velocity of entry ωin at which a rotational angle θp3 can be reached, the rotational angle θp3 being positioned in the forward direction relative to the rotational angle θp1 that is the maximum point at the time of the previous entry.

Figure 15:
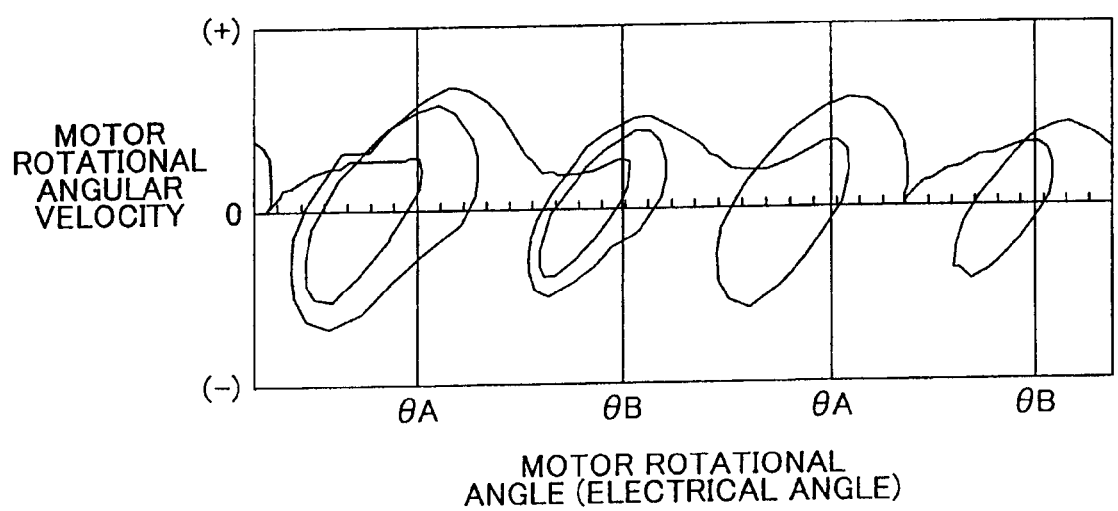
FIG. 15 is a waveform diagram showing how the motor rotational angle (electrical angle) and the motor rotational angular velocity during low-speed steering when rotational angle correction is performed.

When the velocity of entry ωin upon reentry is equal to or lower than the critical velocity ωcr, that is, when the rotational angle θp3, the maximum point, is within the deceleration section, the rotation is repeatedly accelerated by such inverse operation and inverse assist application. As a result, the velocity of entry ωin higher than the critical velocity ωcr can be achieved, and the deceleration section is passed (see FIG. 15).

Figure 16:
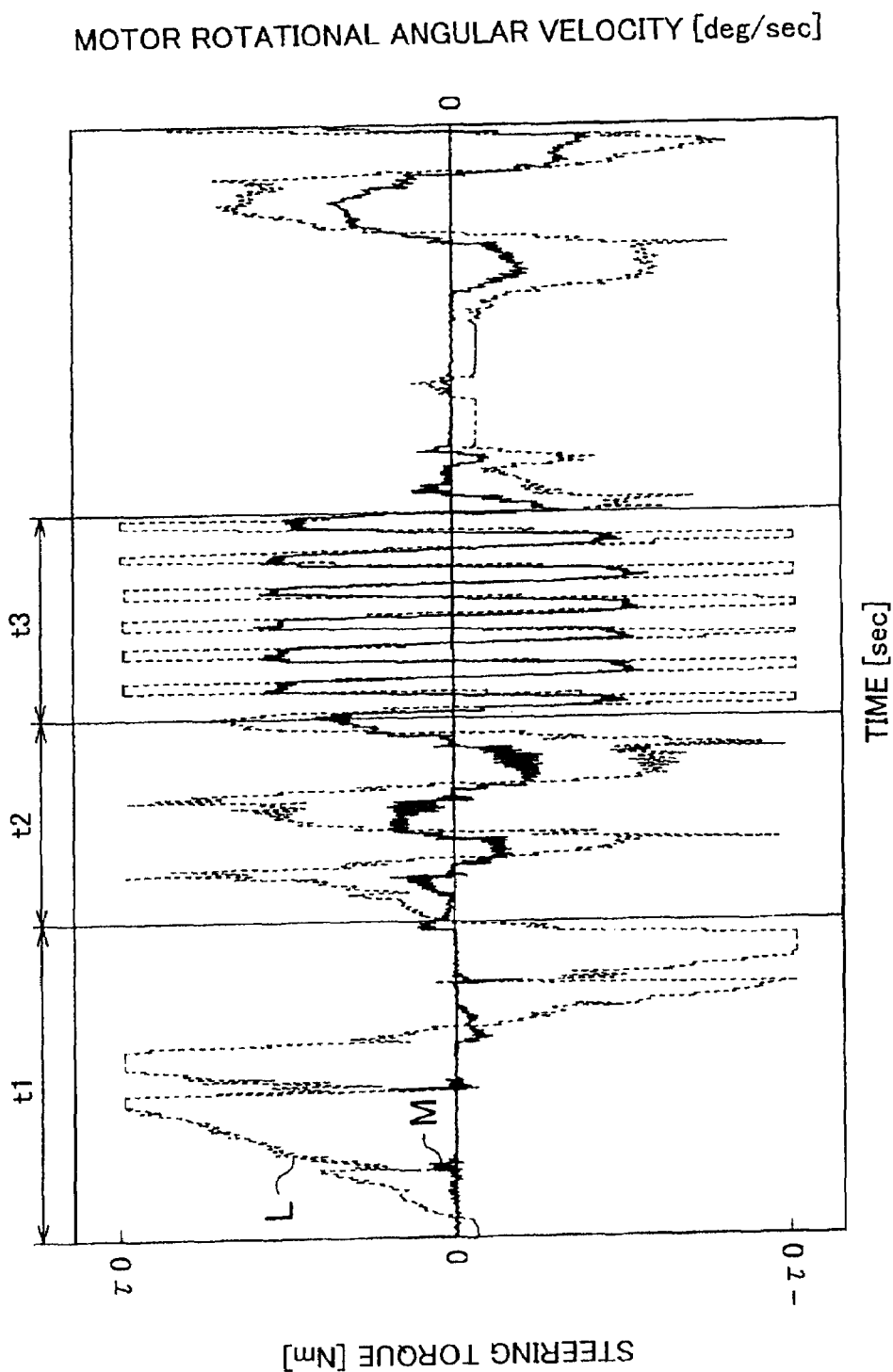
FIG. 16 is a graph showing the relationship between a steering torque and a rotational angular velocity of a motor obtained during two phase drive (rotational angle correction is not performed)

Next, advantageous effects of the rotational angle correction control configured as described above will be discussed. FIGS. 16 and 17 are graphs showing the relationship between the steering torque τ and the rotational angular velocity ω of the motor 12 during two phase drive, that is, the rotational follow-up performance of the motor with respect to the steering operation. FIG. 16 is a graph showing the case where the rotational angle correction control is not performed. FIG. 17 is a graph showing the case where the rotational angle correction control is performed. In these figures, the broken-line waveform L shows variation of the steering torque τ, and the solid-line waveform M shows variation of the rotational angular velocity ω of the motor.

As shown in FIG. 16, with regard to the conventional configuration in which the rotational angle correction control is not performed, in either of the cases where clockwise and counterclockwise steering operations are performed relatively slowly (section t2) and where clockwise and counterclockwise steering operations are performed quickly (section t3), the follow-up performance of the motor with respect to the rotational angular velocity ω in response to variation of the steering torque τ is low. Especially when the steering operation is performed slowly (section t1), that is, during low-speed steering, despite the fact that the value of the steering torque τ reaches its detection limit (|τ0|), only an extremely small rotational angular velocity ω is output. In other words, the motor is barely rotated and the follow-up performance thereof is significantly reduced, that is, a so-called stuck steering wheel is caused.

On the other hand, as shown in FIG. 17, when the rotational angle correction control is performed, in either of the cases where clockwise and counterclockwise steering operations are performed relatively slowly (sections t5, t7) and where clockwise and counterclockwise steering operations are performed quickly (sections t6, t8), the follow-up performance of the motor with respect to the rotational angular velocity ω in response to variation of the steering torque τ is high.

Thus, during the steering operation at a certain speed, of which "the steering direction matches the motor rotational direction", the correction of the rotational speed ω (see FIG. 9) by adding the first correction amount ε1, which depends on the rotational angular velocity ω, functions effectively. Thus, it is conceivable that because smooth rotation of the motor is secured in this way, excellent follow-up performance with respect to the steering operation is achieved.

In addition, it can be seen that the follow-up performance with respect to the steering operation is improved even when the steering operation is performed slowly (during low-speed steering, section t4). In addition, because the steering torque τ and the rotational angular velocity ω were oscillating in this section, it is conceivable that the correction of the rotational angle θ (see FIG. 9) by adding the second correction amount ε2 having the value corresponding the direction the same as the steering direction (that is, having the same sign as the sign of the steering torque τ) functions effectively during low-speed steering in which a stop of rotation or an inverse rotation of the motor is caused due to the existence of such a deceleration section.

When "the steering direction does not match the motor rotational direction" during low-speed steering, the correction performed by adding the second correction amount ε2 is such that the phase is delayed in the motor rotational direction that is opposite to the steering direction, that is, such a correction causes an inverse assist torque such that helps the motor 12 rotate inversely. The oscillations in the steering torque τ and the rotational angular velocity ω seen in FIG. 17 indicate the inversions of rotation of the motor 12 in such a deceleration section and the acceleration of the rotation of the motor due to the inverse assist. It is conceivable that rotation of the motor is accelerated due to such an acceleration mechanism during low-speed steering such as in the section t4 in FIG. 17 and as a result, the occurrence of the stuck steering wheel is suppressed.

Next, an aspect of control for suppressing the oscillation due to the rotational angle correction according to this embodiment will be described.

In this embodiment, during two phase drive, the correction of the rotational angle θ is performed by adding the first correction amount ε1, which depends on the rotational angular velocity ω, and the second correction amount ε2, which depends on the direction (sign) of the steering torque τ, to the rotational angle θ. In this way, the electric power steering device is configured such that smooth rotation of the motor is secured over a wide steering speed range and good steering feeling is achieved.

However, in actuality, it is not easy to design in advance so that the rotational angle correction amount always has the optimal value, and there is a possibility that the excess or deficiency in the rotational angle correction amount occurs and the result is contrary to the original object.

Specifically, when rotation of the motor is smoothed by controlling generation of the inverse assist torque using the "phase deviation" due to the correction of the rotational angle θ, the achieved effects are maximized when the rotational angle correction amount is optimum. When the excess or deficiency in the rotational angle correction amount occurs, that is, when the rotational angle correction amount deviates from the optimum value, the advantageous effects are reduced as the deviation increases, and when the deviation further increases, there is a possibility that the inverse assist torque occurs that, contrary to the original object, impedes smooth rotation of the motor. Such an excess or deficiency in the correction amount is largely due to the influence of the addition of the second correction amount ε2 and there is a tendency that the influence becomes notable during low-speed steering.

Figure 18A:
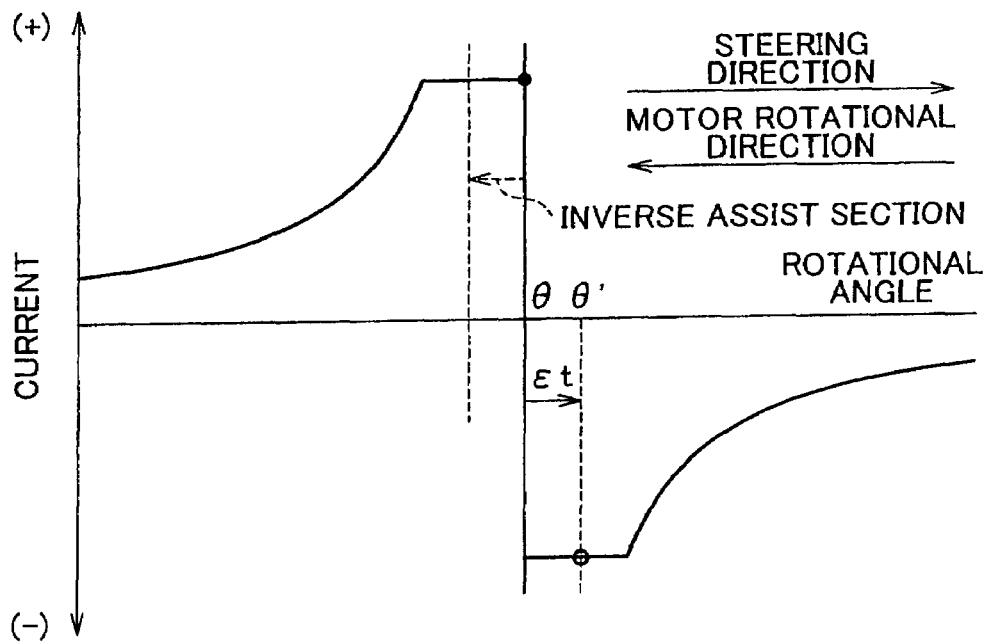
FIGS. 18A and 18B are explanatory diagrams showing the relationship between the amount of correction of the rotational angle and the length of the inverse assist period.
Figure 18B:
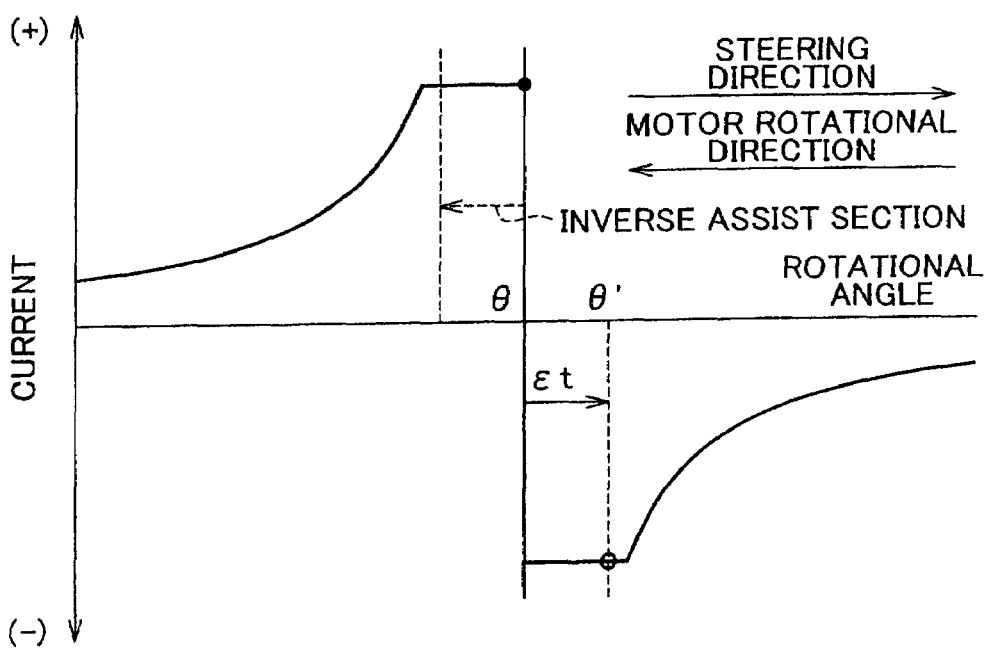

Thus, as shown in FIGS. 18A and 18B, the total amount of the energy that is given by applying the inverse assist when the motor rotates inversely is determined by the length of the period (inverse assist period) during which the inverse assist torque is generated, that is, by the correction amount εt of the rotational angle θ that determines the "amount of deviation of the phase". Specifically, for example, when the example shown in FIG. 18A and the example shown in FIG. 18B are compared, the correction amount εt (absolute value thereof) in the example shown in FIG. 18B is greater than that in the example shown in FIG. 18A. Thus, as compared to the example shown in FIG. 18A, the inverse assist period is longer and therefore, the total amount of the energy given by applying the inverse assist is also greater in the example shown in FIG. 18B.

On the other hand, during low-speed steering, the optimum total amount of the energy given in the form of the inverse assist torque to accelerate rotation of the motor varies depending on the situation. Thus, it is very difficult to previously determine the second correction amount ε2 so that the rotational angle correction amount becomes optimum. Specifically, in order to reliably suppress the occurrence of the stuck steering wheel due to the deficiency in the amount of inverse assist, naturally, it is preferable to set the setting value of the second correction amount ε2 to a relatively large value (absolute value).

However, considering the EPS's function of "causing the motor to generate a torque in the direction such that the steering operation is assisted," it is not preferable that the motor rotate in the direction opposite to the steering direction. Specifically, when the inversions of rotation of the motor 12 intrinsically make a driver feel a sense of discomfort and when the magnitude of the inversions of rotation is large, the driver tends to feel the oscillation. Thus, in view of suppressing the occurrence of oscillation in such acceleration control, it is preferable that the value that is set as the second correction amount ε2 be kept at minimum values such that the excessive inversions of rotation are not caused, that is, the oscillation generated in the steering system is not increased.

During normal steering operation where "the steering direction matches the motor rotational direction" as described above, the second correction amount ε2 substantially means the "raising". However, the rotational angle correction by the second correction amount ε2 is also performed in the low-speed region in which the deadband is set for the first correction amount ε1, which depends on the rotational angular velocity ω of the motor 12, that is, during the low-speed steering during normal steering operation in which the necessity to perform the rotational angle correction for compensating the phase delay is basically low (see FIGS. 13A and 13B). In addition, there is a possibility that such a rotational angle correction by the second correction amount ε2 during normal steering operation induces the occurrence of the inverse assist torque that acts in the direction such that the steering operation is impeded. Thus, in view of suppressing the occurrence of the inverse assist torque that impedes smooth rotation of the motor and the accompanying occurrence of oscillation, it is disadvantageous to use a fixed value having a large value (absolute value) as the second correction amount ε2.

In order to address such conflicting problems, the rotational angle correction controller 40 of this embodiment functions as the oscillation detection means that detects the occurrence of oscillation in the steering system. When the level of the detected oscillation exceeds a predetermined level, the second correction amount ε2 that is added in the rotational angle correction control is changed to a value (ε2') larger than the normal value (absolute value).

Specifically, for the second correction amount ε2, which is the initial value, a value having relatively large absolute value is selected as the setting value so as to reliably suppress the occurrence of the stuck steering wheel. When the level of the oscillation that is occurring in the steering system exceeds a level high enough to affect the actual steering feeling, the second correction amount ε2 is changed to the second correction amount ε2' that has an absolute value smaller than the normal value.

Specifically, when an oscillation occurs, the excessive rotational angle correction amount that is highly probable to have caused the occurrence of the oscillation is reduced. In this way, it is possible to suppress the occurrence of the excessive inversions of rotation in the acceleration control that is performed when the steering direction does not match the motor rotational direction (see FIG. 14). During normal steering operation where "the steering direction matches the motor rotational direction," it is possible to suppress the occurrence of the inverse assist torque that impedes rotation of the motor due to the deviation in the phase. In this embodiment, in this way, the occurrence of the stuck steering wheel is suppressed by the inverse assist that is performed by intentionally causing the deviation in the phase and at the same time, the oscillation due to the inverse assist torque is suppressed.

Specifically, as shown in FIG. 9, the rotational angle correction controller 40 of this embodiment includes an oscillation detection part 45 that detects the occurrence of the oscillation in the steering system, and the oscillation detection part 45 receives the differential value of the steering torque τ (steering torque differential value dτ) and the rotational angular velocity ω of the motor 12. The oscillation detection part 45 of this embodiment determines whether the level of the oscillation in the steering system exceeds the level high enough to affect the actual steering feeling based on the steering torque differential value dτ received, and outputs the result of the determination as an oscillation detection signal S_sv to the second correction amount computing part 42. When the determination result indicates that "the oscillation the level of which exceeds the predetermined level" is detected, the oscillation detection signal S_sv is set to "ON." When the stuck steering wheel detection signal S_sv output by the oscillation detection part 45 is set to "ON," the second correction amount computing part 42 of this embodiment switches the output second correction amount ε2 to a value (ε2') smaller than the normal value.

Figure 19:
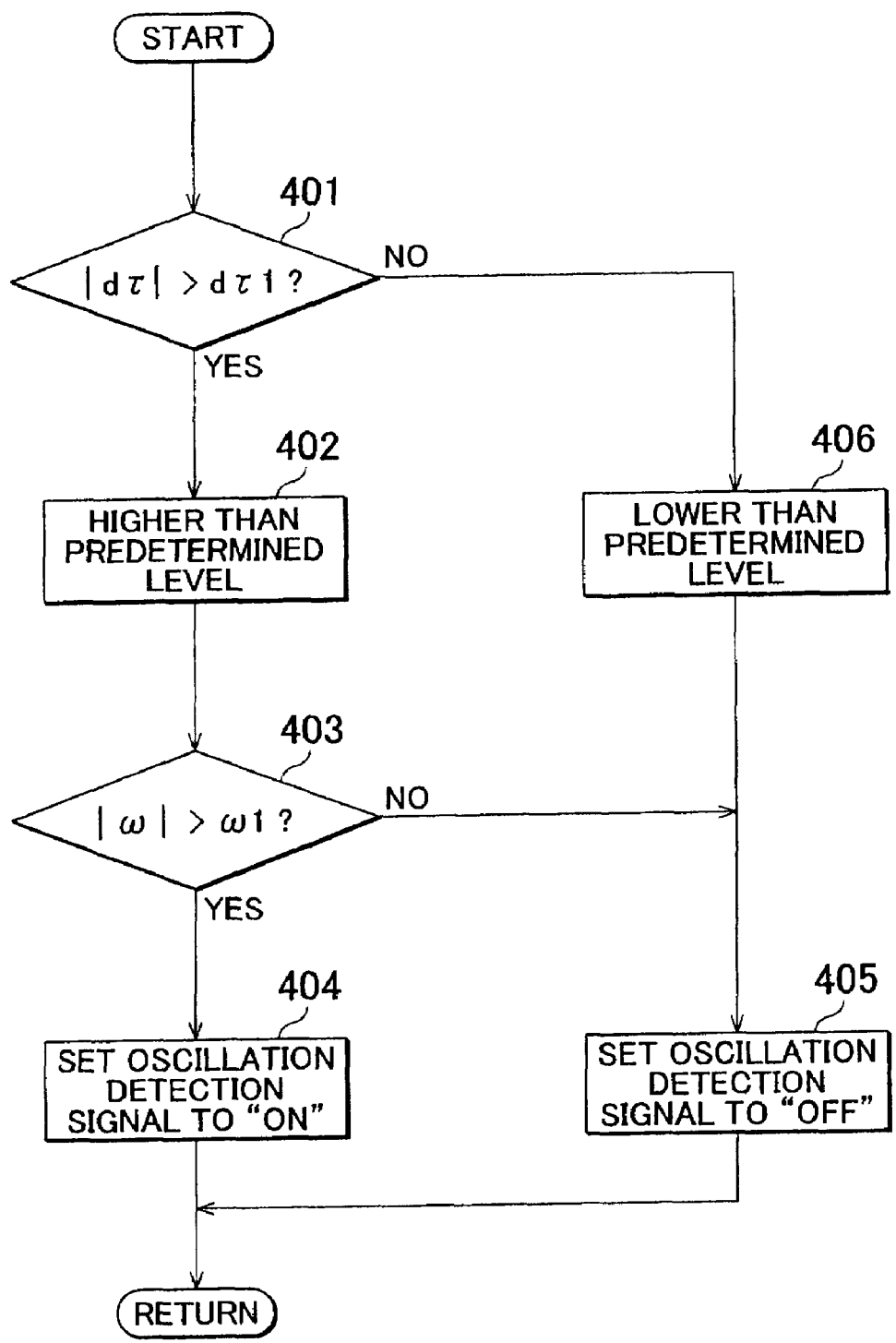
FIG. 19 is a flow chart showing a process of determining the oscillation level and outputting an oscillation detection signal indicating the result of the determination.

Specifically, as shown by the flow chart shown in FIG. 19, the oscillation detection part 45 of this embodiment determines whether the steering torque differential value dτ (absolute value thereof) received by the oscillation detection part 45 exceeds a predetermined threshold value dτ1 (step 401). When the steering torque differential value dτ exceeds the predetermined threshold value dτ1 (|dτ|>dτ1, step 401: YES), it is determined that the level of the oscillation in the steering system exceeds the level high enough to affect the actual steering feeling (higher than the predetermined level, step 402).

When the oscillation detection part 45 of this embodiment determines in step 402 that "the oscillation the level of which exceeds the predetermined level" is detected, the oscillation detection part 45 subsequently determines whether the rotational angular velocity ω (absolute value thereof) of the motor 12 exceeds a predetermined threshold value ω1 corresponding to the critical velocity ωcr (step 403). When the rotational angular velocity ω exceeds the predetermined threshold value ω1 (|ω|>ω1, step 403: YES), the oscillation detection signal S_sv output by the oscillation detection part 45 is set to "ON" (step 404).

Specifically, when the rotational angular velocity of the motor 12 is lower than the critical velocity ωcr and the second correction amount ε2 (absolute value thereof) is reduced, the inverse assist in the acceleration control (see FIG. 14) can fall short, which can result in the occurrence of the stuck steering wheel. Thus, in this embodiment, during such low-speed steering, even when it is determined in step 402 that "there is occurring the oscillation the level of which exceeds the predetermined level," the oscillation detection signal S_sv output by the oscillation detection part 45 is set to "OFF" (step 405) when it is determined that the rotational angular velocity ω is equal to or lower than the predetermined threshold value ω1 ($|ω|≦ω1$, step 403: NO). In other words, the oscillation detection part 45 of this embodiment is configured to set the output oscillation detection signal S_sv to "ON" provided that the steering operation is not the low-speed steering that is highly probable to cause the occurrence of the stuck steering wheel.

When it is determined in step 401 that the steering torque differential value dτ is equal to or lower than the predetermined threshold value dτ1 ($|dτ|≦dτ$, step 401: NO), it is determined that the above predetermined level is not reached (lower than the predetermined level, step 406), and the oscillation detection signal S_sv is set to "OFF" in step 405 without performing the determination process in step 403.

Thus, in this embodiment, the second correction amount-computing part 42 switches between the output second correction amounts ε2 and ε2' based on the oscillation detection signal S_sv output by the oscillation detection part 45, whereby the occurrence of the stuck steering wheel is suppressed by the inverse assist that is performed by intentionally causing the deviation in the phase and at the same time, the oscillation due to the inverse assist is suppressed.

Specifically, the second correction amount ε2 that has a relatively large value (absolute value) is set as the initial value and used, whereby the effect of suppressing the stuck steering wheel is ensured by making the total amount of energy given by the inverse assist large when the motor rotates inversely. When the level of the oscillation in the steering system becomes high enough to affect the actual steering feeling, the correction amount is switched to the second correction amount ε2' that has an absolute value smaller than that of the second correction amount ε2 set as the initial value, so that the deviation of the phase that is highly probable to have caused the occurrence of the oscillation is reduced, whereby the oscillation is reduced.

According to this embodiment, the operations and effects described below can be achieved. (1) The rotational angle correction controller 40 controls generation of the inverse assist torque using the "phase deviation" due to the correction of the rotational angle θ, thereby performing the rotational angle correction control to smooth rotation of the motor. In addition, the rotational angle correction controller 40 functions as the oscillation detection means that detects the occurrence of oscillation in the steering system. When the level of the detected oscillation exceeds the predetermined level, the correction amount in the rotational angle correction control is reduced.

Specifically, when rotation of the motor is smoothed by controlling the occurrence of the inverse assist torque using "phase deviation" due to the correction of the rotational angle θ, the achieved effects are maximized when the rotational angle correction amount is optimal. However, when the excess or deficiency in the rotational angle correction amount occurs, that is, when the rotational angle correction amount deviates from the optimum value, the advantageous effects are reduced as the deviation increases. When the deviation further increases, there is a possibility that the inverse assist torque occurs that, contrary to the original object, impedes smooth rotation of the motor. Thus, it is very difficult to previously set the correction amount so that the rotational angle correction amount is always optimum.

According to the above configuration, however, the unsmooth rotation due to the lack of the correction amount is avoided by setting a relatively large value (absolute value) having a margin as the initial value of the rotational angle correction amount, and when the oscillation the level of which is high enough to affect the steering feeling, the rotational angle correction amount that is highly probable to have caused the occurrence of the oscillation is reduced, whereby the oscillation can be reduced. As a result, it is made possible to further smooth rotation of the motor and realize better steering feeling with a simple configuration.

(2) The rotational angle correction controller 40 includes the second correction amount computing part 42, which computes, based on the steering torque τ, the second correction amount ε2 having a certain value (absolute value) for correcting the rotational angle θ in such a manner that the phase is shifted in the steering operation direction. The rotational angle correction controller 40 then adds the second correction amount ε2 having the certain value to the rotational angle θ to execute the rotational angle correction control. In addition, the rotational angle correction controller 40 includes the oscillation detection part 45 that detects the occurrence of the oscillation in the steering system, and the oscillation detection part 45 determines whether the level of the detected oscillation exceeds the level high enough to affect the actual steering feeling and outputs the result of the determination as an oscillation detection signal S_sv. The second correction amount computing part 42 switches the second correction amount ε2 to the value (ε2') smaller than the normal value when the result indicates the occurrence of "the oscillation the level of which exceeds the predetermined level" (S_sv is ON).

Specifically, when a stop or an inversion of rotation of the motor occurs in the deceleration section that is generated due to performing the current restriction during low-speed steering, by performing the rotational angle correction that shifts the phase in the steering operation direction (steering direction), the inverse assist torque that assists the inverse rotation is generated. Thus, by accelerating rotation of the motor 12 by the energy provided by the inverse assist, it is possible to allow the motor 12 to pass the deceleration section, that is, it is possible to suppress the occurrence of a so-called stuck steering wheel that significantly deteriorates the follow-up performance of the motor with respect to the steering operation.

However, when such a configuration is adopted, especially during low-speed steering in which the effect of the correction is large, the excess or deficiency in the rotational angle correction amount tends to occur and the influence thereof tends to become significant. Specifically, during low-speed steering, the value (absolute value) of the second correction amount ε2 that determines the total amount of energy given by the inverse assist is always constant in the acceleration control performed when the motor rotates inversely, whereas the total amount of energy required to obtain the rotational angular velocity ω of the motor (critical velocity ωcr) that enables the motor to pass the deceleration section varies depending on the situation. Thus, it is very difficult to previously set the second correction amount ε2 that is optimum.

According to the above configuration, however, the second correction amount ε2 that has a relatively large value (absolute value) is set as the initial value, whereby the effect of suppressing the stuck steering wheel is ensured by the inverse assist that is performed by intentionally causing the deviation in the phase. When an oscillation the level of which is high enough to affect the actual steering feeling occurs, the second correction amount ε2 is changed to the second correction amount ε2' that has an absolute value smaller than the initial value, whereby it is possible to reduce the oscillation due to the inverse assist torque. As a result, it is made possible to further smooth rotation of the motor and realize better steering feeling with a simple configuration.

(3) Even when it is determined that "there is occurring the oscillation the level of which exceeds the predetermined level," the oscillation detection part 45 sets the oscillation detection signal S_sv, output by the oscillation detection part 45, to "OFF" when it is determined that the rotational angular velocity ω of the motor 12 is lower than the predetermined threshold value ω1 corresponding to the critical velocity ωcr ($|ω|≦ω1$). Specifically, the switching from the second correction amount ε2 to the second correction amount ε2', that is, the change of the rotational angle correction amount performed by the rotational angle correction controller 40 is performed only when the rotational angular velocity ω of the motor 12 exceeds the predetermined threshold value ω1 ($|ω|>ω1$). Note that although it suffices that the predetermined threshold value ω1 is near the critical velocity ωcr, it is preferable that the predetermined threshold value ω1 is equal to or greater than the critical velocity ωcr.

Specifically, when the rotational angular velocity of the motor 12 is equal to or lower than the critical velocity ωcr and the second correction amount ε2 (absolute value thereof) is reduced, the inverse assist in the acceleration control (see FIG. 14) can fall short, which can result in the occurrence of the stuck steering wheel. Thus, according to the above configuration, it is possible to further ensure the effect of suppressing the stuck steering wheel by the inverse assist while suppressing the oscillation due to the inverse assist torque.

An electric power steering system according to the second embodiment is described hereinafter with reference to the drawings.

A major difference between this embodiment and the above-described first embodiment exists in the mode of the rotational angle correction control during two phase drive. Therefore, for convenience of explanation, the same reference numerals are used for the parts the same as those of the first embodiment, and the explanation of these parts are omitted.

Figure 20:
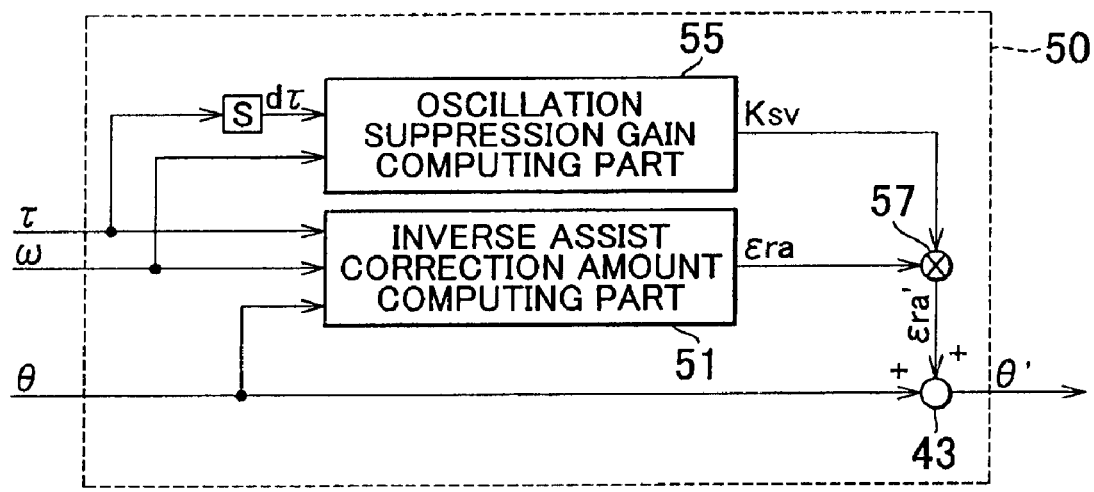
FIG. 20 is a control block diagram of a rotational angle correction controller of a second embodiment.

As shown in FIG. 20, a rotational angle correction controller 50 of this embodiment is provided with an inverse assist correction amount computing part 51 instead of the first and second correction amount computing parts 41 and 42 (see FIG. 9) in the rotational angle correction controller 40 of the first embodiment.

In this embodiment, the inverse assist correction amount computing part 51 receives the steering torque τ, and the rotational angle θ and the rotational angular velocity ω of the motor 12. The inverse assist correction amount computing part 51 detects the occurrence of the stop or the inverse rotation of the motor due to the existence of the deceleration section based on these state quantities and computes the inverse assist correction amount εra such that the rotational angle is corrected so as to shift the phase so that a motor torque in the direction such that the inverse rotation is assisted, that is, an inverse assist torque is generated.

More specifically, in this embodiment, the inverse assist correction amount era output from the inverse assist correction amount computing part 51 has a fixed value (absolute value). Based on the input state quantities, the sign of the inverse assist correction amount εra to shift the phase in the direction in which the inverse assist torque is generated, is determined. Specifically, the sign is determined in view of performing "forward phase correction" or "delay phase correction" with respect to the motor rotational direction so that the inverse assist torque is generated by the rotational angle correction made by adding the inverse assist correction amount εra (εra'). The value, having the predetermined fixed value (absolute value), of which the sign is the thus determined sign is output as the inverse assist correction amount εra.

Specifically, when rotation of the motor is stopped or reversed, the inverse assist correction amount computing part 51 determines the sign of the inverse assist correction amount εra so that the "forward phase correction" or the "delay phase correction" by which the rotational angle θ is shifted, in the direction to the predetermined rotational angle θv, to be the corrected rotational angle θ' based on the positional relationship between the rotational angle θ and the predetermined rotational angle θv corresponding to the asymptotic line (θv=θA or θB).

Specifically, in the power assist control, intrinsically, rotation of the motor is controlled so that motor torque that acts in the steering direction to assist the steering operation is generated. However, as described above, in a device in which phase currents that change in the form of a secant curve or a cosecant curve during two phase drive are caused to flow, the directions of the phase currents are inverted at the predetermined rotational angles θv corresponding to the asymptotic lines. Thus, when the timing of the inversion of each phase current deviates, the motor assist torque of which the direction is opposite to the steering direction, that is, the inverse assist torque is generated. In the above-described first embodiment, when a stop or an inversion of rotation of the motor due to the existence of the deceleration section occurs, rotational angle correction that shifts the phase in the steering direction is made beforehand by adding the second correction amount ε2, and rotation of the motor is accelerated using the inverse assist torque caused by the shift of the phase.

Figure 21A:
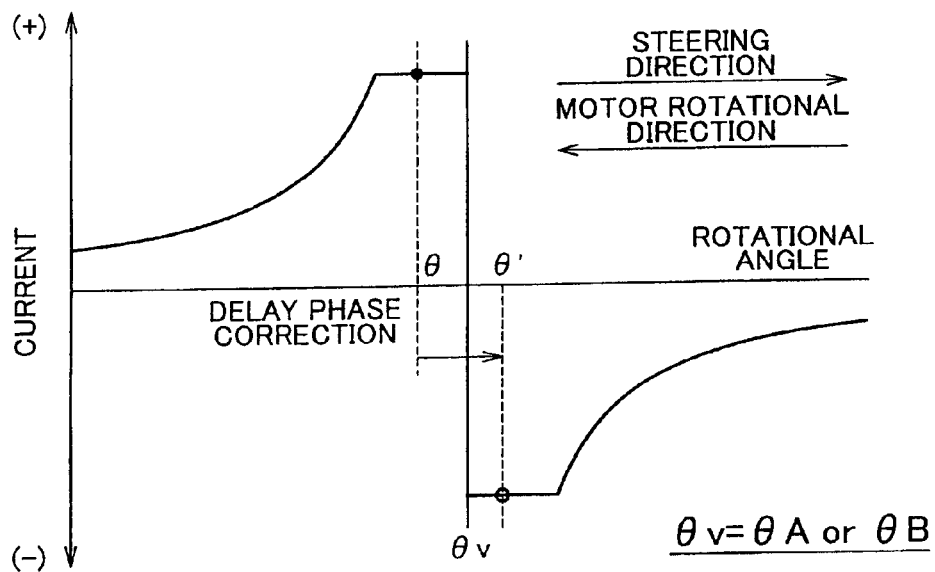
FIGS. 21A and 21B are explanatory diagrams showing a mechanism of how an inverse assist torque is generated due to the delay phase correction and the forward phase correction with respect to the motor rotational direction.

Specifically, in the above-described first embodiment, a rotational angle correction that is "the delay phase correction with respect to the motor rotational direction during inverse rotation" is made, so that the inverse assist torque is generated when the steering direction does not match the motor rotational direction and the rotational angle θ is ahead of the predetermined rotational angle θv, corresponding to the asymptotic line, in the motor rotational direction as shown in FIG. 21A. In other words, in the first embodiment, the inverse assist torque is generated only when the motor 12 rotates inversely due to the existence of the deceleration section and the inverse rotation causes the rotational angle θ to be pulled back in the direction opposite to the steering direction beyond the predetermined rotational angle θv (see FIG. 14).

Figure 21B:
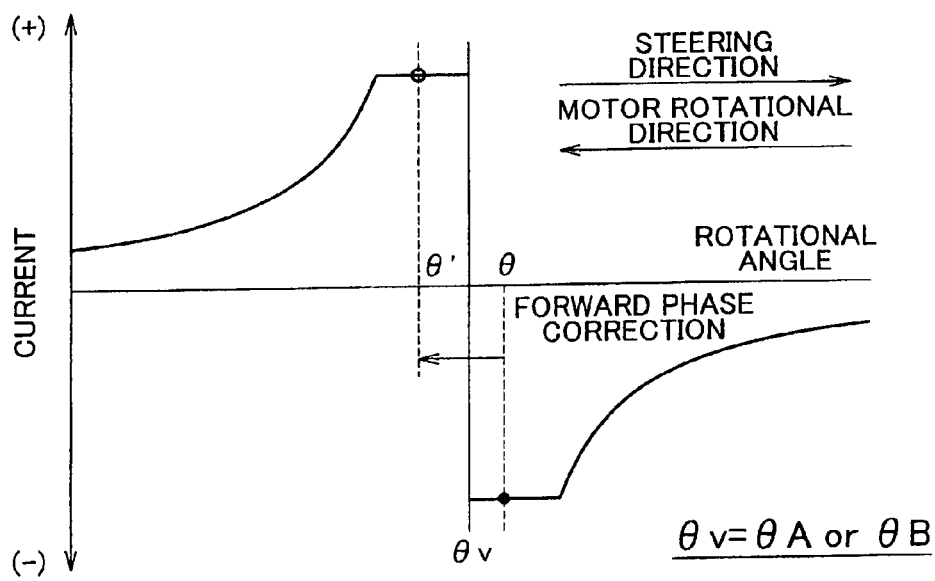

However, when the steering direction does not match the motor rotational direction and the predetermined rotational angle θv corresponding to the asymptotic line is ahead of the rotational angle θ in the motor rotational direction as shown in FIG. 21B, on the other hand, it is possible to generate the inverse assist torque by making the "forward phase correction with respect to the motor rotational direction (delay phase correction with respect to the steering direction)".

Figure 22:
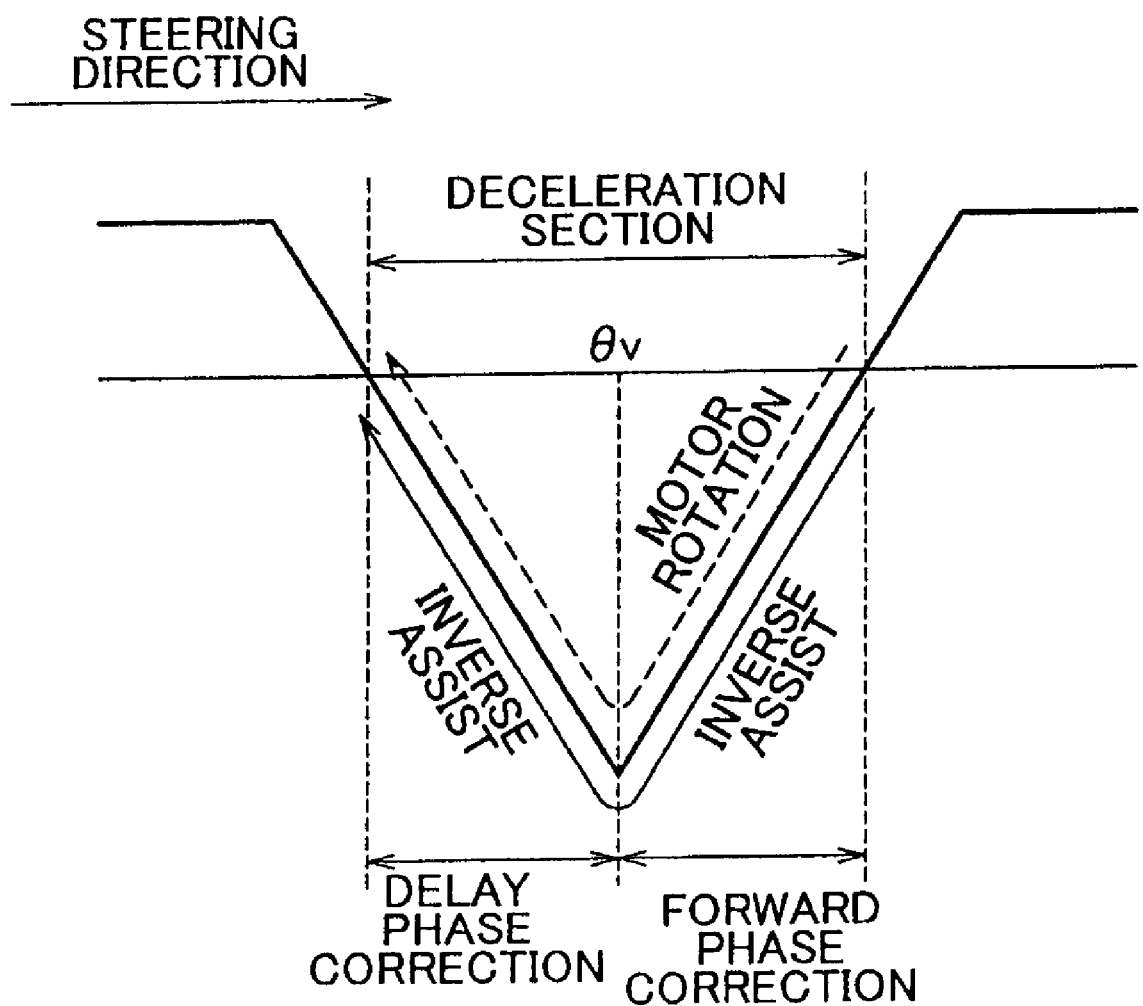
FIG. 22 is an explanatory diagram showing a positional relationship between the rotational angle and the predetermined rotational angle corresponding to an asymptotic line, and the relationship between the rotational angle, and the delay phase correction and the forward phase correction performed depending on the positional relationship.

This embodiment is configured so that the control in which rotation of the motor is accelerated by the inverse assist is more effectively performed by switching between the "forward phase correction" and the "delay phase correction" with respect to the motor rotational direction based on the positional relationship between the rotational angle θ and the predetermined rotational angle θv corresponding to the asymptotic line as shown in FIG. 22.

Figure 23:
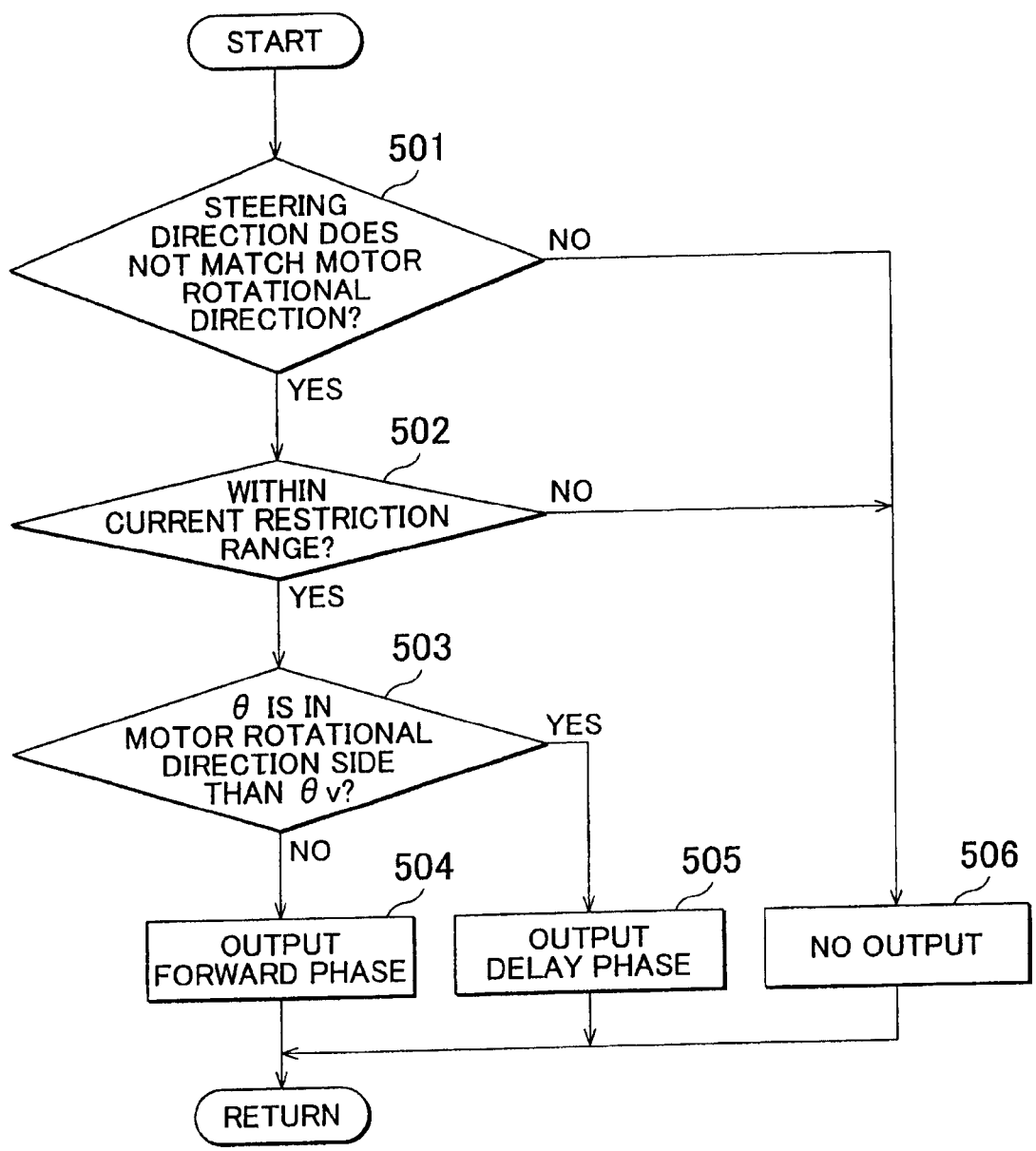
FIG. 23 is a flowchart showing a procedure for outputting the inverse assist correction amount.

Next, a procedure of outputting the inverse assist correction amount in this embodiment will be described. As shown by the flow chart shown in FIG. 23, the inverse assist correction amount computing part 51 determines whether the steering direction does not match the motor rotational direction (step 501), and when the steering direction does not match the motor rotational direction (step 501: YES), it is determined whether the rotational angle θ is within the current restriction range (θ1<θ<θ2, θ3<θ<θ4) (step 502). The determination of the rotational direction in step 501 is performed based on whether the sign of the steering torque τ matches the sign of the rotational angular velocity ω, and the situations in which the sign of the steering torque τ does not match the sign of the rotational angular velocity ω include the situation where the motor 12 is stopped (rotational angular velocity ω=0), as in the case of the first embodiment.

When it is determined that the rotational angle θ is within the current restriction range in step 502 (step 502: YES), the inverse assist correction amount computing part 51 determines whether the present rotational angle θ is ahead of the predetermined rotational angle θv in the motor rotational direction, that is, behind the predetermined rotational angle θv in the steering direction (step 503).

In this step 503, "the rotational angle θ is ahead of the predetermined rotational angle θv in the motor rotational direction (step 503: YES)" means that the rotational angle θ is on the far side from the predetermined rotational angle θv with respect to the motor rotational direction (left side in FIG. 22), and "the rotational angle θ is not ahead of the predetermined rotational angle θv in the motor rotational direction (step 503: NO)" means that the rotational angle θ is on the near side from the predetermined rotational angle θv towards the motor rotational direction (right side in FIG. 22).

When the rotational angle θ is not ahead of the predetermined rotational angle θv in the motor rotational direction (step 503: NO, see FIG. 21B), the sign of the inverse assist correction amount εra that is to be output is determined so that the rotational angle correction made by adding the inverse assist correction amount εra becomes the forward phase correction with respect to the motor rotational direction, and then the inverse assist correction amount εra is output (forward phase output, step 504).

On the other hand, when it is determined that the rotational angle θ is ahead of the predetermined rotational angle θv in the motor rotational direction (step 503: YES, see FIG. 21A), the sign of the inverse assist correction amount εra that is to be output is determined so that the rotational angle correction made by adding the inverse assist correction amount εra becomes the delay phase correction with respect to the motor rotational direction, and then the inverse assist correction amount εra is output (delay phase output, step 505).

When it is determined in step 501 that the steering direction matches the motor rotational direction (step 501: NO) or when it is determined in step 502 that the rotational angle θ is not within the current restriction range (step 502: NO), the inverse assist correction amount computing part 51 does not output the inverse assist correction amount εra (step 506).

Next, an aspect of control for suppressing the oscillation due to the rotational angle correction according to this embodiment will be described.

As described above, in the case where, when an inverse rotation occurs in the motor 12, the inverse rotation is accelerated by using the inverse assist torque generated by the phase deviation due to the correction of the rotational angle, it is very difficult to set the optimal value of the rotational angle correction amount in advance.

In consideration of this fact, in this embodiment, as shown in FIG. 20, the rotational angle correction controller 50 is provided with an oscillation suppression gain-computing part 55. The oscillation suppression gain-computing part 55 performs detection of the oscillation in the steering system as in the case of the oscillation detection part 45 in the first embodiment. In addition, the oscillation suppression gain-computing part 55 computes, based on the result of the oscillation detection, an oscillation suppression gain Ksv that reduces the inverse assist correction amount εra computed by the inverse assist correction amount-computing part 51.

Specifically, in this embodiment, the oscillation suppression gain Ksv output from the oscillation suppression gain-computing part 55 is input to the multiplier 57 along with the inverse assist correction amount εra. The rotational angle correction controller 50 of this embodiment corrects the inverse assist correction amount εra by multiplying the inverse assist correction amount εra by the oscillation suppression gain Ksv and adds the inverse assist correction amount εra' after the correction to the rotational angle θ to reduce the rotational angle correction amount.

Specifically, the oscillation suppression gain-computing part 55 of this embodiment also determines whether the oscillation the level of which exceeds the predetermined level such that the rotational angle correction amount should be reduced is occurring, based on the comparison between the steering torque differential value dτ received by the oscillation suppression gain-computing part 55 and the predetermined threshold value (dτ2). When an oscillation the level of which exceeds the predetermined level occurs, the oscillation suppression gain-computing part 55 calculates the oscillation suppression gain Ksv that reduces the inverse assist correction amount εra inversely proportionally to the level of the oscillation when the level of the oscillation exceeds the predetermined level.

Figure 24:
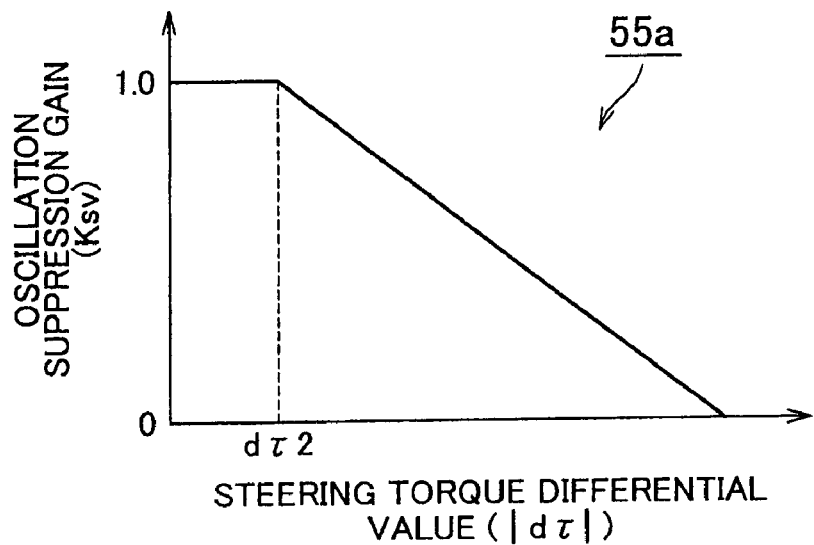
FIG. 24 is a schematic diagram of a map used to compute an oscillation suppression gain.

More specifically, the oscillation suppression gain-computing part 55 of this embodiment is provided with a map 55a as shown in FIG. 24 by which the absolute value (|dτ|) of the steering torque differential value dτ and the oscillation suppression gain Ksv are associated with each other. In the map 55a, the oscillation suppression gain Ksv is set as follows: when the absolute value of the steering torque differential value dτ is equal to or less than the predetermined threshold value dτ2 (|dτ|≦dτ2), the oscillation suppression gain Ksv is "1"; when the absolute value of the steering torque differential value dτ is greater than the threshold value dτ2 (|dτ|>dτ2), the oscillation suppression gain Ksv is equal to or less than "1" and reduced as the absolute value of the steering torque differential value dτ increases. The oscillation suppression gain-computing part 55 computes the oscillation suppression gain Ksv by performing a map-based computation using the map 55a.

The predetermined threshold value dτ2 of this embodiment is a value (absolute value) smaller than the predetermined threshold value dτ1 in the first embodiment, that is, set based on the low level oscillation that is not high enough to affect the actual steering feeling. The oscillation suppression gain-computing part 55 of this embodiment also determines whether the rotational angular velocity ω of the motor 12 exceeds the critical velocity ωcr when outputting the oscillation suppression gain Ksv as in the case of the oscillation detection part 45 of the first embodiment. When the rotational angular velocity ω is equal to or less than the critical velocity ωcr, the value of the oscillation suppression gain Ksv output by the oscillation suppression gain-computing part 55 is set to "1". Specifically, in this case, the reduction of the rotational angle correction amount by the oscillation suppression gain Ksv is not performed.

As described above, according to this embodiment, the operations and effects described below can be achieved. (1) The rotational angle correction controller 50 is provided with the inverse assist correction amount computing part 51, which detects the stop or the inverse rotation of the motor due to the existence of the deceleration section and computes the inverse assist correction amount εra having a fixed value (absolute value). Then, the inverse assist correction amount computing part 51 determines the sign of the inverse assist correction amount εra so that the "forward phase correction" or the "delay phase correction" by which the rotational angle θ is shifted in the direction to the predetermined rotational angle θv to the corrected rotational angle θ' is performed based on the positional relationship between the rotational angle θ and the predetermined rotational angle θv corresponding to the asymptotic line (θv=θA, θB) and outputs the inverse assist correction amount εra.

With the above configuration, in the case where the motor 12 rotates inversely due to the existence of the deceleration section during two phase drive, the inverse assist torque is generated not only when the rotational angle θ is pulled back in the direction opposite to the steering direction beyond the predetermined rotational angle θv by the inverse rotation, but also when the rotational angle θ is still ahead of the predetermined rotational angle θv in the steering direction. As a result, it is possible to more effectively accelerate rotation of the motor 12.

(2) The rotational angle correction controller 50 includes the oscillation suppression gain-computing part 55, which performs detection of the oscillation in the steering system. The oscillation suppression gain-computing part 55 computes the oscillation suppression gain Ksv that reduces the inverse assist correction amount εra computed by the inverse assist correction amount-computing part 51 when the occurrence of the oscillation the level of which exceeds the predetermined level such that the rotational angle correction amount should be reduced, is detected.

According to the above configuration, the inverse assist correction amount εra that has a relatively large value (absolute value) is set as the initial value in advance, whereby the effect of suppressing the stuck steering wheel is ensured by the inverse assist that is performed by intentionally causing the deviation in the phase. When an oscillation the level of which exceeds the predetermined level occurs, by reducing the inverse assist correction amount εra with the use of the oscillation suppression gain Ksv, it is possible to reduce the oscillation due to the inverse assist torque. As a result, it is made possible to further smooth rotation of the motor and realize better steering feeling with a simple configuration.

(3) When an oscillation the level of which exceeds the predetermined level such that the rotational angle correction amount should be reduced occurs, the oscillation suppression gain-computing part 55 calculates the oscillation suppression gain Ksv that reduces the inverse assist correction amount εra inversely proportionally to the level of the oscillation when the level of the oscillation exceeds the predetermined level.

According to the above configuration, it is possible to more effectively reduce the oscillation due to the inverse assist torque. (4) The inverse assist correction amount-computing part 51 does not output the inverse assist correction amount εra when it is determined that the rotational angle θ is not within the current restriction range.

Specifically, by additionally imposing a determination condition that the rotational angle θ is within the current restriction range, the case is excluded where the inverse rotation is caused by the application of reaction force to the turning wheel 6, such as when a tire hits a curbstone, and it is therefore possible to more accurately suppress the occurrence of the stuck steering wheel by the inverse assist.

Note that each of the embodiments may be changed as follows. In each of the above embodiments, the ECU 11 serving as the motor control device has three control modes: "normal control mode," "assist suspension mode," and "two phase drive mode." However, the modes for executing the motor control upon occurrence of an abnormality are not limited to these three modes. Specifically, any mode is possible as long as the motor control is executed with two electrification phases other than the phase with an electrification failure when an electrification failure occurs. Moreover, the method of detecting (determining) an abnormality is also not limited to the configurations of the embodiments.

In each of the above embodiments, the current command value computing part 23 outputs a phase current command value for one of the two phases other than the phase with an electrification failure during two phase drive. The motor control signal generating part 24 computes a phase voltage command value for the phase and then computes a phase voltage command values for the other phase on the basis of the former phase voltage command value. However, the current command value computing part 23 may output phase current command values for both of the two phases other than the phase with an electrification failure.

Furthermore, in each of the above embodiments, the phase current command value Iv* of the V phase is computed when an abnormality occurs in the U phase or the W phase, and the phase current command value Iu* of the U phase is computed when an abnormality occurs in the V phase, on the basis of the above equations (1) to (3). However, the phase current command value (Iw*) of the W phase may be computed when an abnormality occurs in the U phase or the V phase, and the phase current command value (Iu*) of the U phase may be computed when an abnormality occurs in the W phase. Note that each of the phase current command values can be computed by inverting the signs shown in the equations (1) to (3).

Moreover, each phase current command value that is computed upon the occurrence of an electrification abnormality does not have to be completely the same as that computed by the equations (1) to (3). In other words, the effects similar to those of the embodiments can be still obtained even when the phase current command value changes in the form of a rough secant curve or a rough cosecant curve on the basis of an asymptotic line, which is the predetermined rotational angle, or when computing the phase current command value that changes in the similar form. However, needless to say, when the phase current command value is computed based on the above equations (1) to (3), the motor current by which a torque closest to the requested torque is generated can be generated, and more remarkable effects can be obtained by the method of computing a value closed to the phase current command value computed based on each of the equations.

In the second embodiment, both the forward phase correction and the delay phase correction are executed as the phase compensation control for executing the inverse assist control (see FIGS. 21A and 21B). However, only either one of the forward phase correction and the delay phase correction may be performed.

In the above embodiments, the rotational angle correction controller 40 (50) is provided in the second current controller 24*b*, but it may be provided outside the second current controller 24*b*. In the second embodiment, a rotational angle correction for intentionally generating the inverse assist torque is performed on the condition that the rotational angle θ is within the current restriction range (see FIG. 23, step 502). However, it is not necessary to perform such a determination as to whether such a condition is satisfied.

In the above-described first embodiment, when the oscillation detection signal S_sv output by the oscillation detection part 45 indicates the occurrence of "the oscillation the level of which exceeds the predetermined level" (S_sv is ON), the second correction amount computing part 42 switches the second correction amount ∈2, output by the second correction amount-computing part 42, to the value (∈2') smaller than the normal value, thereby reducing the rotational angle correction amount. However, the invention is not limited to such a configuration, and a configuration may be adopted in which correction is made by adding, to the normal correction amount, a correction amount for reducing the rotational angle θ (or θ') or by multiplying the normal correction amount by a gain (or a correction coefficient) as in the case of the second embodiment. In this case, as in the case of the above-described second embodiment, a configuration may be adopted in which the rotational angle correction amount is reduced inversely proportionally to the level of the oscillation in the steering system when the level of the oscillation exceeds the predetermined level.

In the above-described embodiments, based on the detected steering torque differential value dτ, the occurrence of the oscillation in the steering system is detected and the oscillation level is determined. However, the invention is not limited to these embodiments. A configuration may be adopted in which the detection and the determination are performed based on the rotational angular velocity ω of the motor 12 or the steering velocity (mechanical angular velocity of the motor). In this case, a condition that the disagreement between the steering direction and the motor rotational direction has occurred may be additionally imposed to avoid mistakenly determining that a sudden steering operation is performed, for example.

Figure 25:
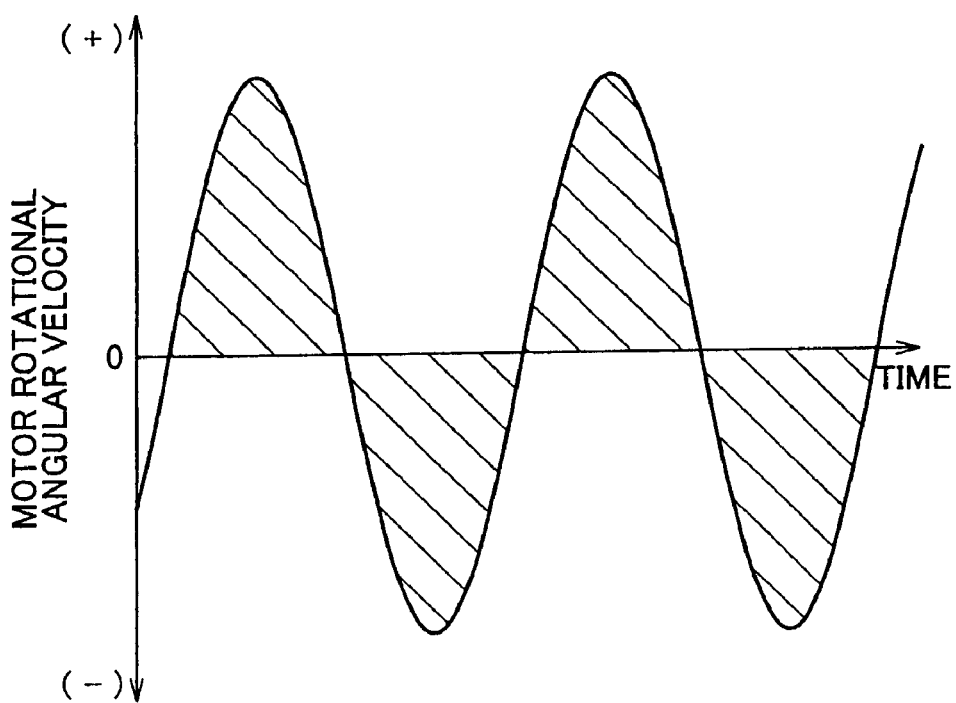
FIG. 25 is an explanatory diagram showing another example of how the oscillation level is determined.

As shown in FIG. 25, the determination of the oscillation level may be made based on the integrated value (area of the hatched regions in FIG. 25) of the rotational angular velocity ω of the motor 12 when the oscillation is occurring.

Figure 26:
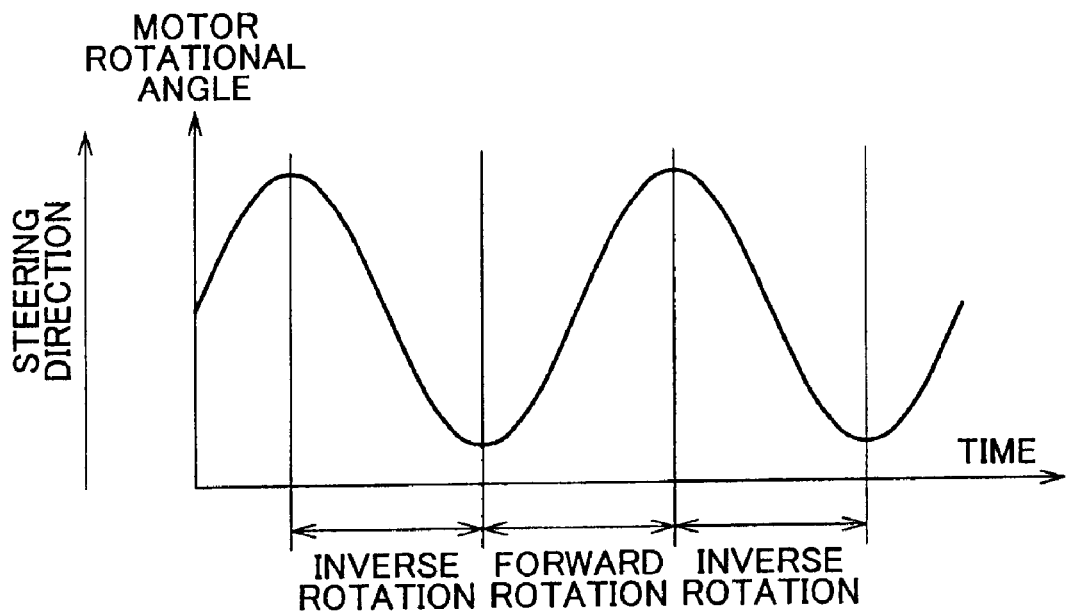
FIG. 26 is an explanatory diagram showing another example of the timing at which the oscillation level is determined.

As shown in FIG. 26, a configuration may be adopted in which the determination of the oscillation level is made only during inverse rotation where the steering direction does not match the motor rotational direction. With this configuration, it is possible to more accurately determine the level of the oscillation caused by the inverse assist torque.

Figure 27:
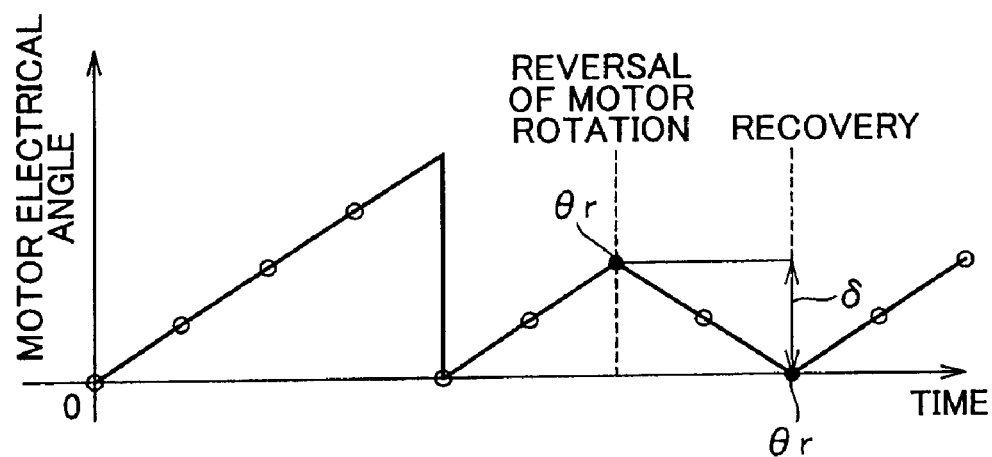
FIG. 27 is an explanatory diagram showing another example of how the oscillation level is determined.

As shown in FIG. 27, the determination of the oscillation level may be made based on the variation δ of the rotational angle θ that occurs during the time period from when the sign of the rotational angle (electrical angle) θ of the motor 12 is inverted to when the sign is again inverted. Specifically, if the rotational angle θ is sampled at the timing indicated by the mark "o," first, the rotational angle θr at the timing at which the sign is inverted is stored and, when the sign is again inverted, the difference between the rotational angle θr' at the latter timing and the rotational angle θr, that is, the variation δ is determined. Then, the oscillation level is determined based on the variation δ. With regard to the determination of the oscillation level, the determination may be made directly at all times by determining that the oscillation level is high when the variation δ is large. However, the variation δ may be indirectly used in the determination by, for example, using the moving average of the variation δ or the integrated value of the variation δ in a predetermined period of time as data. By adopting such a configuration, even when the amplitude of the oscillation is not uniform or when a so-called whirling occurs, it is possible to accurately determine the level (magnitude) of the occurring oscillation. As a result, it is made possible to prevent erroneous operation of the stuck steering wheel suppression control and more effectively suppress the oscillation.

Figure 28:
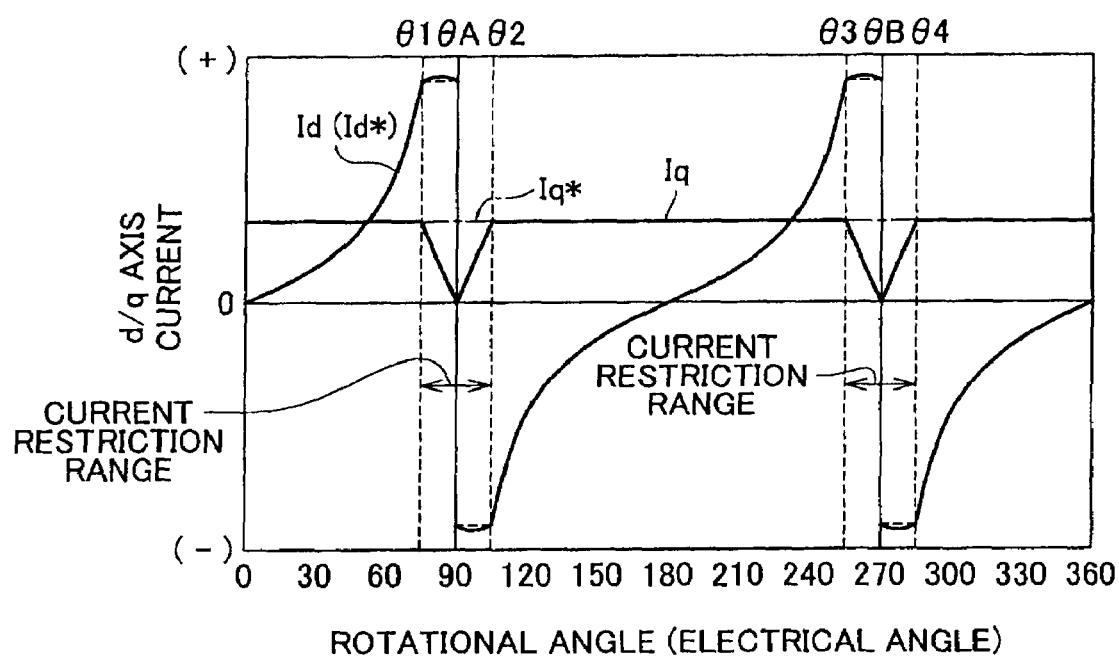
FIG. 28 is an explanatory diagram showing how a d-axis current and q-axis current change during two phase drive (when the U phase has an electrification failure) in another example.
Figure 29:
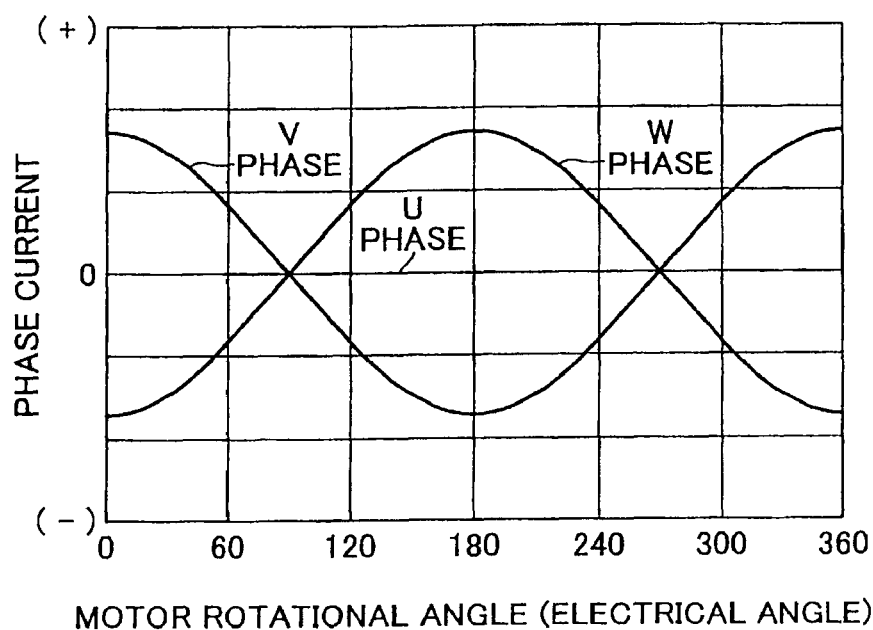
FIG. 29 is an explanatory diagram showing a conventional example of two phase drive that is performed with two electrification phases other than a phase having an electrification failure.
Figure 30:
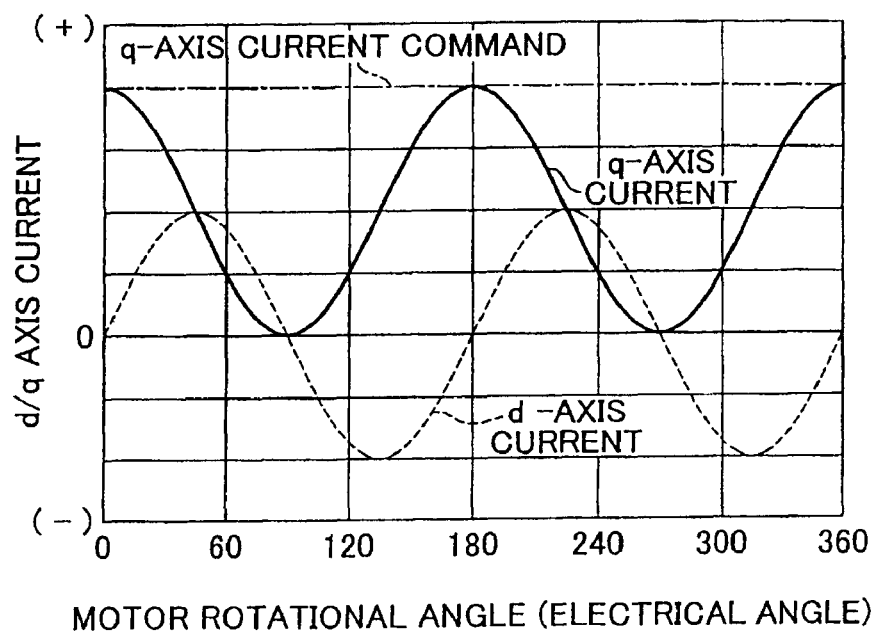
FIG. 30 is an explanatory diagram showing how a d-axis current and q-axis current change during conventional two phase drive.

The mode of current control is not necessarily limited to the phase current feedback control performed in the three-phase AC coordinate system (U, V, W) of each of the embodiments. For example, the d-axis current command value Id* is computed using the following equations (6) to (8), the d-axis current command value Id* changing in the form of a tangent curve of which asymptotic lines are the lines on which the rotational angles are the predetermined rotational angles θA, θB corresponding to the phase having an electrification failure. Then, the motor control signal may be generated by executing the current feedback control of the d/q coordinate system on the basis of the computed d-axis current command value Id* (see FIG. 28 showing an example where the U phase has an electrification failure). Moreover, the motor control signal may be output by executing open control instead of the feedback control.

When the U phase has an electrification failure:

$$I_d^* = I_q^* \frac{\sin\theta}{\cos\theta} = I_q^* \tan\theta \qquad (6)$$

When the V phase has an electrification failure:

$$I_d^* = -I_q^* \frac{\sin\left(\theta + \frac{\pi}{3}\right)}{\sin\left(\theta - \frac{\pi}{6}\right)} = I_q^* \tan\left(\theta - \frac{2\pi}{3}\right) \qquad (7)$$

When the W phase has an electrification failure:

$$I_d^* = -I_q^* \frac{\sin\left(\theta + \frac{2\pi}{3}\right)}{\sin\left(\theta + \frac{\pi}{6}\right)} = I_q^* \tan\left(\theta + \frac{2\pi}{3}\right) \qquad (8)$$

While, in the above embodiments, the invention is embodied in the form of a rack-assisted electric power steering device, the invention may be applied to other types of electric power steering devices, such as column-assisted electric power steering devices.

What is claimed is:

1. An electric power steering device, comprising:
    a steering force assisting device having a motor that functions as a drive source and providing a steering system with an assist power for assisting a steering operation; and
    an oscillation detection part that detects an occurrence of an oscillation in the steering system; and
    a control device that controls an operation of the steering force assisting device through a supply of a drive power to the motor, the control device including:
        a motor control signal output part that outputs a motor control signal;
        a drive circuit that supplies the drive power of three phases to the motor on the basis of the motor control signal; and
        an abnormality detecting part that detects an occurrence of a failure caused in the phases of the motor,
    wherein: the motor control signal output part generates the motor control signal by executing current control on the basis of a rotational angle of the motor and, when the occurrence of the failure is detected, executes output of the motor control signal by means of two electrification phases other than a phase with the failure, when the occurrence of the failure is detected, the motor control signal output part performs a correction of the rotational angle and changes an amount of the correction of the rotational angle in accordance with a level of the oscillation detected, and when the occurrence of the failure is detected, the motor control signal output part executes the current control for supplying each of the electrification phases with a phase current that changes substantially in the form of a secant curve, a cosecant curve, or a tangent curve based on an asymptotic line, on which the rotational angle is a predetermined rotational angle corresponding to a phase with the failure, executes current restriction for restricting the phase current within a predetermined range, performs a correction of the rotational angle so that an angular phase is shifted in a direction of the steering operation, determines if the level of the oscillation detected exceeds a predetermined level, and performs a reduction of an amount of correction of the rotational angle when the level of the oscillation detected exceeds the predetermined level.

2. The electric power steering device according to claim 1, wherein the reduction of the amount of correction is performed when the rotational angular speed of the motor is equal to or higher than a predetermined speed.

3. The electric power steering device according to claim 1, wherein the motor control signal output part reduces the amount of correction of the rotational angle inversely proportionally to the level of the oscillation when the level of the oscillation exceeds the predetermined level.

4. The electric power steering device according to claim 1, wherein the oscillation detection part determines the level of the oscillation based on a variation of the rotational angle that occurs during the time period from when a sign of the rotational angle is inverted to when the sign is again inverted.

5. The electric power steering device according to claim 1, wherein, when a direction of the steering operation does not match a rotational direction of the motor, the motor control signal output part performs the correction of the rotational angle so that the angular phase is shifted in a direction to the predetermined rotational angle corresponding to the asymptotic line.

6. The electric power steering device according to claim 5, wherein the correction of the rotational angle is performed when the rotational angle of the motor falls within a range in which the current restriction is performed.

7. The electric power steering device according to claim 6, wherein the reduction of the amount of correction is performed when the rotational angular speed of the motor is equal to or higher than a predetermined speed.

8. The electric power steering device according to claim 5, wherein the motor control signal output part reduces the amount of correction of the rotational angle inversely proportionally to the level of the oscillation when the level of the oscillation exceeds the predetermined level.

9. The electric power steering device according to claim 5, wherein the oscillation detection part determines the level of the oscillation based on a variation of the rotational angle that occurs during the time period from when a sign of the rotational angle is inverted to when the sign is again inverted.

10. The electric power steering device according to claim 1, wherein the motor control signal output part determines if the level of the oscillation detected exceeds the predetermined level if an absolute value of a steering torque differential value exceeds a predetermined threshold value.

11. A control method of an electric power steering device which has a steering force assisting device having a motor that functions as a drive source and providing a steering system with an assist power for assisting a steering operation and an oscillation detection part that detects an occurrence of an oscillation in the steering system, and which controls an operation of the steering force assisting device through a supply of a drive power to the motor, the method comprising:

generating and outputting a motor control signal by executing current control on the basis of a rotational angle of the motor;

supplying the drive power of three phases to the motor on the basis of the motor control signal;

detecting an occurrence of a failure caused in the phases of the motor; and when the occurrence of the failure is detected, executing output of the motor control signal by means of two electrification phases other than a phase with the failure, performing a correction of the rotational angle, and changing an amount of the correction of the rotational angle in accordance with a level of the oscillation detected, wherein, when the occurrence of the failure is detected, executing the current control for supplying each of the electrification phases with a phase current that changes substantially in the form of a secant curve, a cosecant curve, or a tangent curve based on an asymptotic line, on which the rotational angle is a predetermined rotational angle corresponding to a phase with the failure, executing current restriction for restricting the phase current within a predetermined range, performing a correction of the rotational angle, based on which the current control is executed, so that a deviation of an angular phase is controlled, determining if the level of the oscillation detected exceeds a predetermined level, and reducing an amount of the correction of the rotational angle when the level of the oscillation detected exceeds the predetermined level.

12. The control method of an electric power steering device according to claim 11, wherein the reduction of the amount of correction is performed when the rotational angular speed of the motor is equal to or higher than a predetermined speed.

13. The control method of an electric power steering device according to claim 11, wherein the amount of correction of the rotational angle is reduced inversely proportionally to the level of the oscillation when the level of the oscillation exceeds the predetermined level.

14. The control method of an electric power steering device according to claim 11, wherein the level of the oscillation is determined based on a variation of the rotational angle that occurs during the time period from when a sign of the rotational angle is inverted to when the sign is again inverted.

15. The control method of an electric power steering device according to claim 11, wherein, when a direction of the steering operation does not match a rotational direction of the motor, the correction of the rotational angle is performed so that the angular phase is shifted in a direction to the predetermined rotational angle corresponding to the asymptotic line.

16. The control method of an electric power steering device according to claim 15, wherein the correction of the rotational angle is performed when the rotational angle of the motor falls within a range in which the current restriction is performed.

17. The control method of an electric power steering device according to claim 15, wherein the reduction of the amount of correction is performed when the rotational angular speed of the motor is equal to or higher than a predetermined speed.

18. The control method of an electric power steering device according to claim 15, wherein the amount of correction of the rotational angle is reduced inversely proportionally to the level of the oscillation when the level of the oscillation exceeds the predetermined level.

19. The control method of an electric power steering device according to claim 15, wherein the level of the oscillation is determined based on a variation of the rotational angle that occurs during the time period from when a sign of the rotational angle is inverted to when the sign is again inverted.

20. The control method of an electric power steering device according to claim 11, wherein the level of the oscillation detected exceeds the predetermined level if an absolute value of a steering torque differential value exceeds a predetermined threshold value.

* * * * *